(12) United States Patent
Hattori et al.

(10) Patent No.: US 12,656,307 B2
(45) Date of Patent: Jun. 16, 2026

(54) ION MOVEMENT MEASURING DEVICE AND ION MOVEMENT MEASURING METHOD

(71) Applicant: HONDA MOTOR CO., LTD., Tokyo (JP)

(72) Inventors: Tatsuya Hattori, Saitama (JP); Yuji Isogai, Saitama (JP); Hideki Sakai, Saitama (JP); Hiroshi Sakai, Saitama (JP); Atsushi Sakurai, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 692 days.

(21) Appl. No.: 18/156,354

(22) Filed: Jan. 18, 2023

(65) Prior Publication Data

US 2023/0236148 A1 Jul. 27, 2023

(30) Foreign Application Priority Data

Jan. 27, 2022 (JP) ................................. 2022-010952

(51) Int. Cl.
*G01N 27/416* (2006.01)
*G01N 27/333* (2006.01)
*G01N 27/417* (2006.01)

(52) U.S. Cl.
CPC ....... *G01N 27/4166* (2013.01); *G01N 27/333* (2013.01); *G01N 27/417* (2013.01)

(58) Field of Classification Search
None
See application file for complete search history.

(56) References Cited

U.S. PATENT DOCUMENTS 5,308,468 A * 5/1994 Katoh .................. G01N 27/403
204/418
10,324,016 B2 * 6/2019 Kim .................... G01N 15/0806
(Continued)

FOREIGN PATENT DOCUMENTS

CN 108562517 A 9/2018
CN 111341641 A 6/2020
(Continued)

OTHER PUBLICATIONS

Office Action issued Jun. 16, 2025 in the CN Patent Application No. 202310063190.0.

*Primary Examiner* — Richard Isla
(74) *Attorney, Agent, or Firm* — CKC & Partners Co., LLC

(57) ABSTRACT

To accurately detect the moving state of secondary atomic ions at the time of targeted voltage application and the moving state of secondary atomic ions due to diffusion. An ion movement measuring device includes a test specimen and a detector. The test specimen has a first electrode, a second electrode, and an electrolyte disposed between them. The first electrode and the second electrode each have a layer of an identical element, and have the identical potential in a state where no voltage is applied from outside the test specimen. At least the first electrode contains second atoms being isotopes of first atoms at an abundance ratio higher than a natural abundance ratio of the second atoms, the first atoms being present at a highest natural abundance ratio in the element. The detector detects some of ions of the first atoms and the second atoms, which are discharged from the electrolyte.

18 Claims, 17 Drawing Sheets

(56) References Cited

U.S. PATENT DOCUMENTS

| | | | | |
|---|---|---|---|---|
| 10,804,562 | B2 * | 10/2020 | Ellis ................. | H01M 10/0525 |
| 12,399,145 | B2 * | 8/2025 | Kojima ............... | G01N 27/301 |
| 2006/0102464 | A1 | 5/2006 | Tillotson | |
| 2016/0036039 | A1 | 2/2016 | Kuriyama et al. | |
| 2020/0194245 | A1 | 6/2020 | Smith et al. | |
| 2023/0296684 | A1 * | 9/2023 | Stefanopoulou ... | G01R 31/3865 |
| | | | | 702/60 |

FOREIGN PATENT DOCUMENTS

| | | | |
|---|---|---|---|
| JP | 2011222460 | A | 11/2011 |
| JP | 2021144859 | A | 9/2021 |

* cited by examiner

FIG. 2

START

↓

PREPARING STEP ~ S1

↓

PRODUCING STEP ~ S2

↓

MOVING STEP ~ S3

↓

DIVIDING STEP ~ S4

↓

DETECTING STEP ~ S5

↓

ANALYZING STEP ~ S6

↓

END

FIG. 10

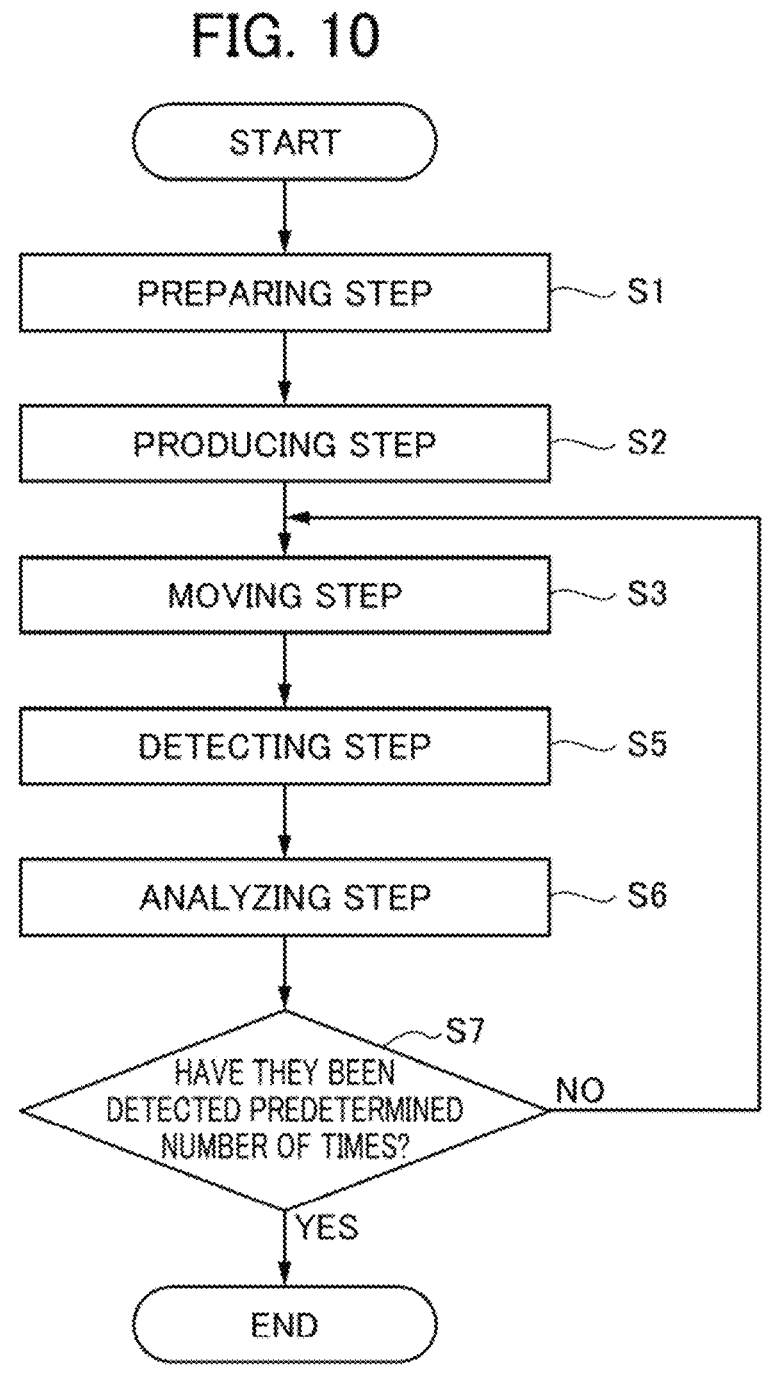

START

PREPARING STEP — S1

PRODUCING STEP — S2

MOVING STEP — S3

DETECTING STEP — S5

ANALYZING STEP — S6

S7
HAVE THEY BEEN DETECTED PREDETERMINED NUMBER OF TIMES?

NO

YES

END

ION MOVEMENT MEASURING DEVICE AND ION MOVEMENT MEASURING METHOD

This application is based on and claims the benefit of priority from Japanese Patent Application No. 2022-010952, filed on 27 Jan. 2022, the content of which is incorporated herein by reference.

BACKGROUND OF THE INVENTION

Field of the Invention

The present invention relates to a measuring device and a measuring method for ions moving in an electrolyte.

Related Art

In recent years, from a viewpoint of lowering carbon dioxide emissions to reduce adverse effects on the global environment, electric vehicles such as EVs and HEVs have become popular. Due to these circumstances, there is urgent demanded to develop high-performance batteries.

Patent Document 1: Japanese Unexamined Patent Application, Publication No. 2021-144859

SUMMARY OF THE INVENTION

In battery developments, it is important to precisely measure a degree of ion conductivity, which affects output characteristics and other features. However, in a test specimen of lithium-ion battery, which has an electrolyte between a positive electrode and a negative electrode, for example, it is difficult to separately observe certain lithium atomic ions, which move in the electrolyte, from other lithium atomic ions. Therefore, what the inventors have thought is to form a part of a positive electrode, which is in contact with an electrolyte, mainly based on atoms of lithium-6, which is an isotope of lithium-7 whose natural abundance ratio is highest, among atoms of lithium, to cause an electric current to flow from the positive electrode, via the electrolyte, to a negative electrode, and to observe ions of atoms of lithium-6, which move in the electrolyte.

With this method, it is possible to separately observe ions of atoms of lithium-6 from ions of atoms of lithium-7 based on a difference in mass. However, the inventors have focused on the problems described below. That is, when a base part of a positive electrode is formed of a positive electrode material that is used in ordinary batteries, and a base part of a negative electrode is formed of a negative electrode material that is also used in ordinary batteries, for example, a difference in potential, which may occur due to the materials differing from each other, may cause a voltage to be unintentionally applied between terminals provided at both ends of the electrolyte. Thereby, it is impossible to detect a moving state of ions of atoms of lithium-6 at a point in time of targeted voltage application. Furthermore, in a diffusion test for ions of atoms of lithium-6, where a test specimen is left as it is without applying a voltage, a voltage that is applied unintentionally makes it difficult to precisely detect a moving state of ions of the atoms of lithium-6 due to only diffusion.

Note that, although a case when ions of atoms of lithium-6 are separately observed from ions of atoms of lithium-7 in lithium has been described above, ions of second atoms may be separately observed from ions of first atoms in another element. However, similar or identical problems may occur also in this case.

In view of the issues described above, an object of the present invention is to make it possible to precisely detect a moving state of ions of second atoms such as ions of atoms of lithium-6 at a point in time of targeted voltage application and a moving state of ions of the second atoms due to diffusion.

The inventors have completed the present invention by focusing on the fact that, by allowing an electrolyte to be sandwiched between a first electrode containing second atoms at a higher abundance ratio than its natural abundance ratio and a second electrode that is identical in potential to the first electrode, and by allowing a voltage to be externally applied between both the electrodes, it is possible to precisely detect a moving state of ions of the second atoms at a point in time of targeted voltage application. The present invention is directed to an ion movement measuring device according to (1) to (4) described below and an ion movement measuring method according to (5) to (10) described below.

(1) An ion movement measuring device including:

a test specimen having a first electrode, a second electrode, and an electrolyte disposed between the first electrode and the second electrode, the first electrode and the second electrode each having a layer of an identical element, and being identical to each other in potential in a state where no voltage is applied from outside the test specimen, the first electrode at least containing second atoms that are isotopes of first atoms at an abundance ratio higher than a natural abundance ratio of the second atoms, the first atoms present at a highest natural abundance ratio in the element;

a detector that detects some of ions of the first atoms and the second atoms, the some of the ions being discharged from the electrolyte.

Note that, a state where the first electrode and the second electrode are identical to each other in potential in a state where no voltage is applied from outside the test specimen may be achieved when, for example, the first electrode and the second electrode are each formed of only a layer of the identical element or the first electrode and the second electrode are each formed by stacking a layer of the identical element with each other on a base member made of an identical material with each other.

According to this configuration, it is possible to separately observe ions of the second atoms from ions of the first atoms based on a difference in mass. Moreover, by applying a voltage between the first electrode and the second electrode from outside the test specimen, it is possible to apply the voltage between both the terminals of the electrolyte for only an intended period of time. Moreover, since the first electrode and the second electrode each contain an identical element and are identical in potential in a state where no voltage is applied from outside the test specimen, there is no concern that a voltage is unintentionally applied between both the terminals of the electrolyte. Therefore, when a voltage is applied from outside a test specimen, it is possible to precisely detect a moving state of ions of the second atoms at a point in time of targeted voltage application. Furthermore, when a test specimen is left as it is without applying a voltage from outside the test specimen, it is possible to precisely detect a moving state of ions of the second atoms due to diffusion without the effects of an unintentional voltage.

(2) The ion movement measuring device according to (1) described above, further including a mover that applies a voltage between the first electrode and the second electrode to allow a side of the first electrode to be higher in potential to cause ions of the first atoms and the second atoms to move from the side of the first electrode to a side of the second electrode in the test specimen.

According to this configuration, it is possible to apply, by the mover, a desired voltage between the first electrode and the second electrode.

(3) The ion movement measuring device according to (1) or (2) described above, in which the electrolyte has a solid electrolyte, the identical element is lithium, the first atoms are atoms of lithium-7, and the second atoms are atoms of lithium-6.

According to this configuration, it is possible to adopt the present invention to tests for developing lithium-ion batteries each including a solid electrolyte.

(4) The ion movement measuring device according to (1) or (2) described above, in which the second electrode contains the second atoms at an abundance ratio higher than the natural abundance ratio of the second atoms.

According to this configuration, it is possible to produce the first electrode and the second electrode using an identical material. Therefore, it is possible to easily produce the test specimen.

(5) The ion movement measuring device according to (1) or (2) described above, in which the second electrode contains the first atoms at an abundance ratio higher than an abundance ratio of the first atoms contained in the first electrode, and contains the second atoms at an abundance ratio lower than an abundance ratio of the second atoms contained in the first electrode.

According to this configuration, since the first electrode contains the second atoms at a higher abundance ratio than that of the second electrode, it is possible to easily determine that an increase in ions of the second atoms in the electrolyte is caused by the fact that the ions of the second atoms have moved from the side of the first electrode.

(6) The ion movement measuring device according to (1) or (2) described above, in which the detector detects ions of the first atoms and the second atoms at a plurality of points in a direction from the side of the first electrode to the side of the second electrode in the test specimen, and further including:

a creator that creates, based on a result of detections by the detector, an actual measurement profile that plots concentration of the ions of the first atoms or the second atoms at the plurality of points;

a calculator that uses a plurality of patterns of diffusion parameters each including a diffusivity coefficient of the ions in the test specimen to calculate, per each of the diffusion parameters, an arithmetic operation profile which is a result of an arithmetic operation for the concentration; and a determiner that determines, from among the calculated plurality of arithmetic operation profiles, the arithmetic operation profile that is identified to have a smallest deviation from the actual measurement profile to determine the diffusion parameter corresponding to the determined arithmetic operation profile.

Also in this configuration, as in the case of (1) cited in this configuration, since the first electrode and the second electrode are identical to each other in potential, there is no concern that a voltage is unintentionally applied between both the terminals of the electrolyte. Under this circumstance, the detector detects ions at a plurality of points in the test specimen. Then, the creator creates an actual measurement profile based on a result of detections by the detector. Therefore, it is possible to precisely detect the movement of ions due to diffusion without the effects of an unintentional voltage, and to precisely create an actual measurement profile.

Then, the determiner determines the arithmetic operation profile that is identified to have the smallest deviation from the actual measurement profile to determine a diffusion parameter corresponding to the arithmetic operation profile. Therefore, it is possible to calculate an arithmetic operation profile when a condition such as a leaving time or a temperature is changed, in a backward manner from the determined diffusion parameter. Thereby, it is possible to estimate the diffusion state of ions when the condition is changed.

(7) The ion movement measuring device according to (6) described above, in which the diffusion parameters each include the diffusivity coefficient of the ions that diffuse from the electrolyte to one electrode of the first electrode and the second electrode and the diffusivity coefficient of the ions that diffuse from the one electrode to the electrolyte.

According to this configuration, since diffusion parameters each include diffusivity coefficients of ions in a plurality of parts of a test specimen, it is possible to further precisely estimate a diffusion state of the ions in the test specimen.

(8) The ion movement measuring device according to (1) or (2) described above, in which the electrolyte in the test specimen contains at least one of an active material, a conductive auxiliary agent, or a binder.

A positive electrode material used in a secondary battery may contain an active material, a conductive auxiliary agent, a binder, and other materials. Due to these circumstances, it is possible to adopt, according to this configuration, for example, a positive electrode material for a secondary battery as an electrolyte for a test specimen.

(9) An ion movement measuring method using a test specimen having a first electrode, a second electrode, and an electrolyte disposed between the first electrode and the second electrode, the first electrode and the second electrode each having a layer of an identical element, and being identical to each other in potential in a state where no voltage is applied from outside the test specimen, at least the first electrode containing second atoms that are isotopes of first atoms at an abundance ratio higher than a natural abundance ratio of the second atoms, the first atoms present at a highest natural abundance ratio in the element, the ion movement measuring method including:

a detecting step of detecting some of ions of the first atoms and the second atoms, the some of the ions being discharged from the electrolyte.

According to this method, it is possible to achieve effects similar to those of the device according to (1) described above.

(10) The ion movement measuring method according to (9) described above, further including a moving step of applying a voltage, from outside the test specimen, between the first electrode and the second electrode to allow a side of the first electrode to be higher in potential to cause ions of the first atoms and the second atoms to move from the side of the first electrode to a side of the second electrode in the test specimen, in which, in the detecting step, some of the ions of the first atoms and the second atoms, the some of the ions being discharged from the electrolyte, during or after the moving step, are detected.

According to this configuration, it is possible to achieve effects similar to those of the device according to (2) described above.

(11) The ion movement measuring method according to (9) or (10) described above, in which the electrolyte has a solid electrolyte,

(11) The ion movement measuring method according to (9) or (10) described above, in which the electrolyte has a solid electrolyte, According to this configuration, it is possible to adopt this method to tests for developing lithium-ion batteries each including a solid electrolyte.

(12) The ion movement measuring method according to (10) described above, in which the detecting step is performed in a state where no voltage is applied from outside the test specimen after the moving step.

According to this configuration, it is possible to simply detect a moving state of ions at a point in time of targeted voltage application, compared with a case where a voltage is applied from outside a test specimen and ions discharged from an electrolyte are detected.

(13) The ion movement measuring method according to (12) described above, further including a dividing step of dividing the electrolyte between the moving step and the detecting step, in which some of the ions of the first atoms and the second atoms are discharged from a divided cross section of the electrolyte and are detected in the detecting step.

According to this configuration, it is possible to precisely detect a moving state of ions, compared with a case where the electrolyte is not divided and ions discharged from only an end face of an electrolyte are detected, for example.

(14) The ion movement measuring method according to (13) described above, in which, in the dividing step, the electrolyte is divided such that the divided cross section extends from the first electrode to the second electrode.

According to this configuration, it is possible to detect a moving state of ions at portions in an ion moving direction in the electrolyte.

(15) The ion movement measuring method described in any one of (12) to (14), in which, in the detecting step, some of ions discharged from an end face of the electrolyte are detected in a state where the electrolyte is not divided, and the detecting step is performed at a plurality of time points, each time point corresponding to a different total voltage application time during the moving step.

According to this configuration, it is possible to detect a moving state of ions at a plurality of voltage application time points.

(16) The ion movement measuring method according to (9) or (10) described above, in which, in the detecting step, some of ions of the first atoms and the second atoms are detected at a plurality of points in a direction from the side of the first electrode to the side of the second electrode in the test specimen, and further including:

a creating step of creating, based on a result of detections in the detecting step, an actual measurement profile that plots concentration of the ions of the first atoms or the second atoms at the plurality of points;

a calculating step of using a plurality of patterns of diffusion parameters each including a diffusivity coefficient of the ions in the test specimen to calculate, per each of the diffusion parameters, an arithmetic operation profile which is a result of an arithmetic operation for the concentration; and a determining step of determining, from among the calculated plurality of arithmetic operation profiles, the arithmetic operation profile that is identified to have a smallest deviation from the actual measurement profile to determine the diffusion parameter corresponding to the determined arithmetic operation profile.

According to this configuration, it is possible to achieve effects similar to those of the device according to (6) described above.

(17) The ion movement measuring method according to (16) described above, in which the diffusion parameters each include the diffusivity coefficient of the ions that diffuse from the electrolyte to one electrode selected from the first electrode and the second electrode and the diffusivity coefficient of the ions that diffuse from the one electrode to the electrolyte.

According to this configuration, it is possible to achieve effects similar to those of the device according to (7) described above.

(18) The ion movement measuring method according to (9) or (10) described above, in which the electrolyte in the test specimen contains at least one selected from an active material, a conductive auxiliary agent, and a binder.

According to this configuration, it is possible to achieve effects similar to those of the device according to (8) described above.

With the device according to (1) described above and the method according to (9) described above, it is possible to precisely detect a moving state of ions of the second atoms at a point in time of targeted voltage application and a moving state of ions of the second atoms due to diffusion.

Furthermore, with the configurations according to (2) to (8) described above, which cite (1) described above, and the configurations according to (10) to (18) described above, which cite (9) described above, it is possible to achieve respective additional effects.

BRIEF DESCRIPTION OF THE DRAWINGS

FIG. 2 is a flowchart illustrating an ion movement measuring method;

FIG. 10 is a flowchart illustrating an ion movement measuring method according to a second embodiment;

DETAILED DESCRIPTION OF THE INVENTION

Embodiments of the present invention will now be described herein with reference to the accompanying drawings. However, the present invention is not limited to the embodiments described below. It is possible to appropriately make modifications and implementations without departing from the scope of the present invention.

First Embodiment

Figure 1:
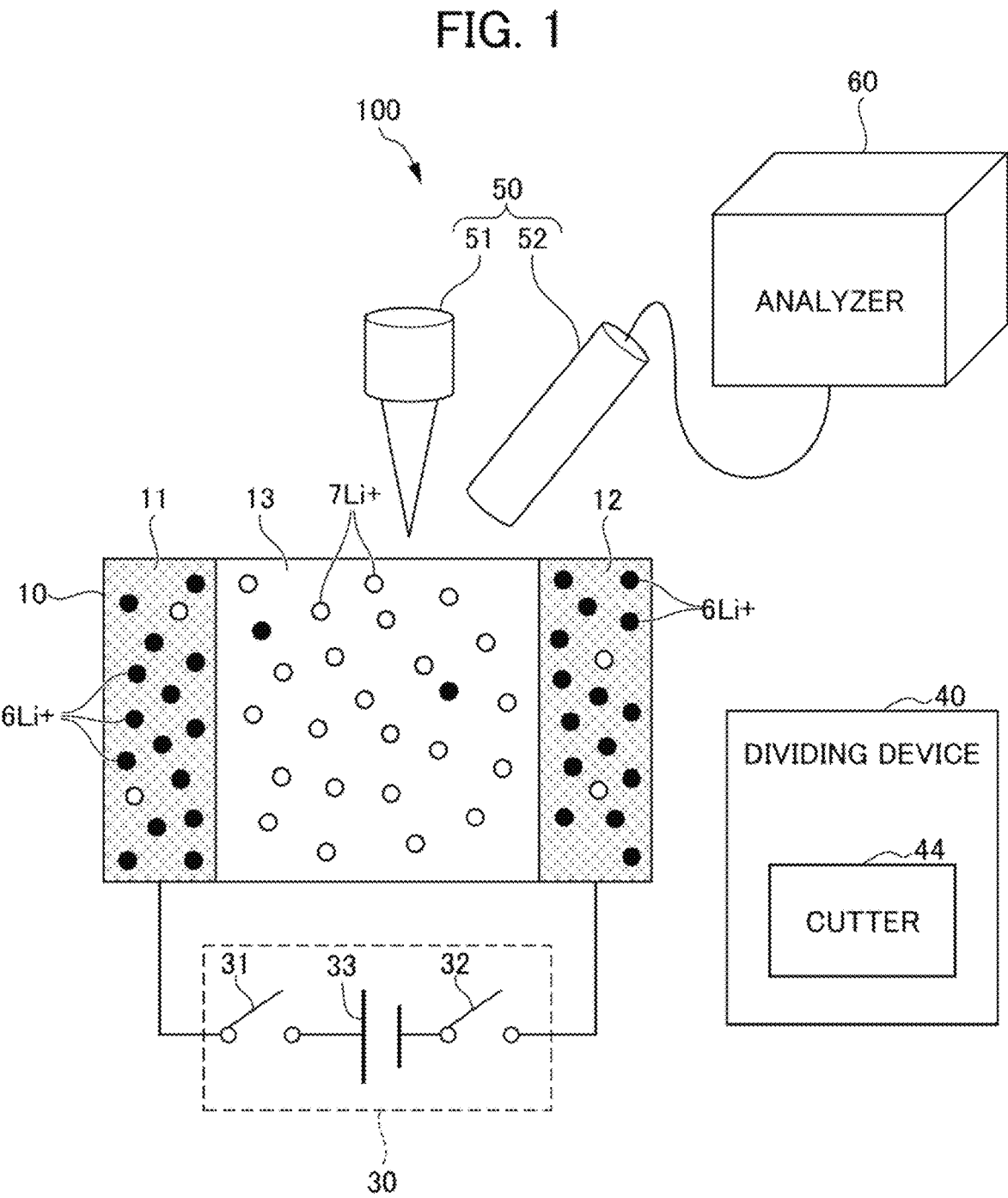
FIG. 1 is a view illustrating an ion movement measuring device according to a first embodiment.

FIG. 1 is a schematic diagram illustrating an ion movement measuring device 100 according to the present embodiment. The ion movement measuring device 100 includes a test specimen 10, a mover 30, a dividing device 40, a detector 50, and an analyzer 60. Hereinafter atoms of lithium-7, that is, atoms of lithium each having an atomic mass of 7 are denoted as "7Li" and ions of 7Li are denoted as "7Li+", and atoms of lithium-6, that is, atoms of lithium each having an atomic mass of 6 are denoted as "6Li" and ions of 6Li are denoted as "6Li+". Note that, in lithium, atoms whose natural abundance ratio is highest are 7Li.

The test specimen 10 includes a first electrode 11, a second electrode 12, and an electrolyte 13. The electrolyte 13 is a solid electrolyte, and is disposed between the first electrode 11 and the second electrode 12. More specifically, the electrolyte 13 in the test specimen 10, which is made of an electrolyte material for secondary batteries in the present embodiment, may be made of a positive electrode material for secondary batteries, for example. In that case, the electrolyte 13 in the test specimen 10 may contain, for example, at least one selected from an active material, a conductive auxiliary agent, and a binder.

Both the first electrode 11 and the second electrode 12, which are also referred to as the electrodes 11, 12, contain lithium only. Therefore, there will be no difference in potential, which may occur due to a difference in material, between the first electrode 11 and the second electrode 12. Therefore, the first electrode 11 and the second electrode 12 are identical to each other in potential in a state where no voltage is applied from outside the test specimen 10.

Specifically, each of the first electrode 11 and the second electrode 12 is a layer of metallic lithium that mainly contains 6Li. Therefore, both the electrodes 11, 12 each contain 6Li at a higher abundance ratio than its natural abundance ratio, and each contain 7Li at a lower abundance ratio than its natural abundance ratio. More specifically, both the electrodes 11, 12 each contain 6Li at an abundance ratio of approximately 95%, and each contain 7Li at an abundance ratio of approximately 5%.

The mover 30 includes a switch 31 and a voltage source 33. A positive electrode terminal of the voltage source 33 is electrically coupled to the first electrode 11 via the first switch 31, and a negative electrode terminal of the voltage source 33 is electrically coupled to the second electrode 12 via the second switch 32. Hereinafter the first switch 31 and the second switch 32 will be collectively referred to as the "switches 31, 32". When the switches 31, 32 are turned ON in this state, a voltage is applied between the first electrode 11 and the second electrode 12 to set a side of the first electrode 11 higher in potential, applying the voltage between both terminals of the electrolyte 13. Thereby, in the test specimen 10, 6Li+ and 7Li+ move from the side of the first electrode 11 to a side of the second electrode 12.

The dividing device 40 is a device that divides the test specimen 10, and includes a cutter 44 configured to cut the test specimen 10.

The detector 50 includes an irradiation part 51 and a detection part 52. The irradiation part 51 is configured to perform energy irradiation E such as laser irradiation, ion irradiation, or electron irradiation toward the electrolyte 13 to urge discharge of 6Li+ and 7Li+ from the electrolyte 13. The detection part 52 is configured to detect those 6Li+ and 7Li+ that are discharged from the electrolyte 13.

The analyzer 60 is configured to analyze, based on those 6Li+ and 7Li+ that are detected by the detection part 52, a moving state of 6Li+ in the test specimen 10.

Figure 2:
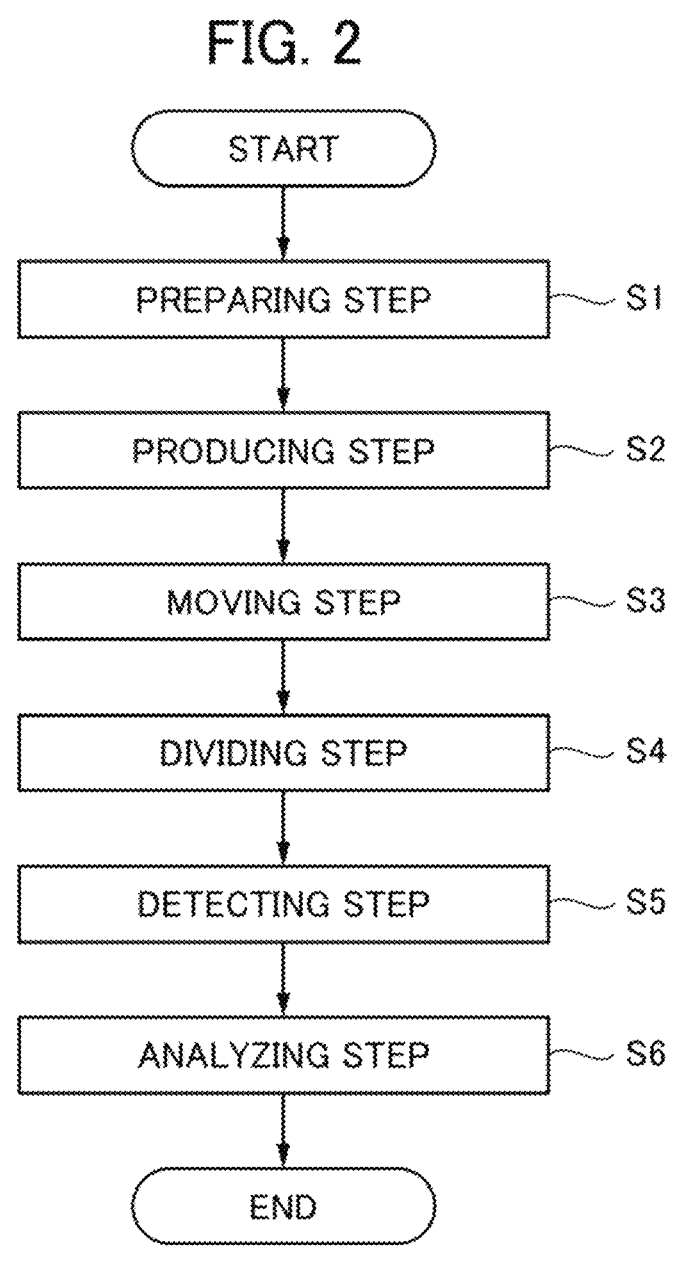

FIG. 2 is a flowchart illustrating an ion movement measuring method using the ion movement measuring device 100 described above. In this ion movement measuring method, a preparing step S1, a producing step S2, a moving step S3, a dividing step S4, a detecting step S5, and an analyzing step S6 are performed in order.

In the preparing step S1, a sulfur-based solid electrolyte serving as a material of the electrolyte 13 and pieces of lithium foil serving as materials of the first electrode 11 and the second electrode 12 are prepared. The pieces of lithium foil each mainly contain 6Li, and each have a thickness ranging from approximately 0.1 to approximately 0.4 mm.

Figure 3:
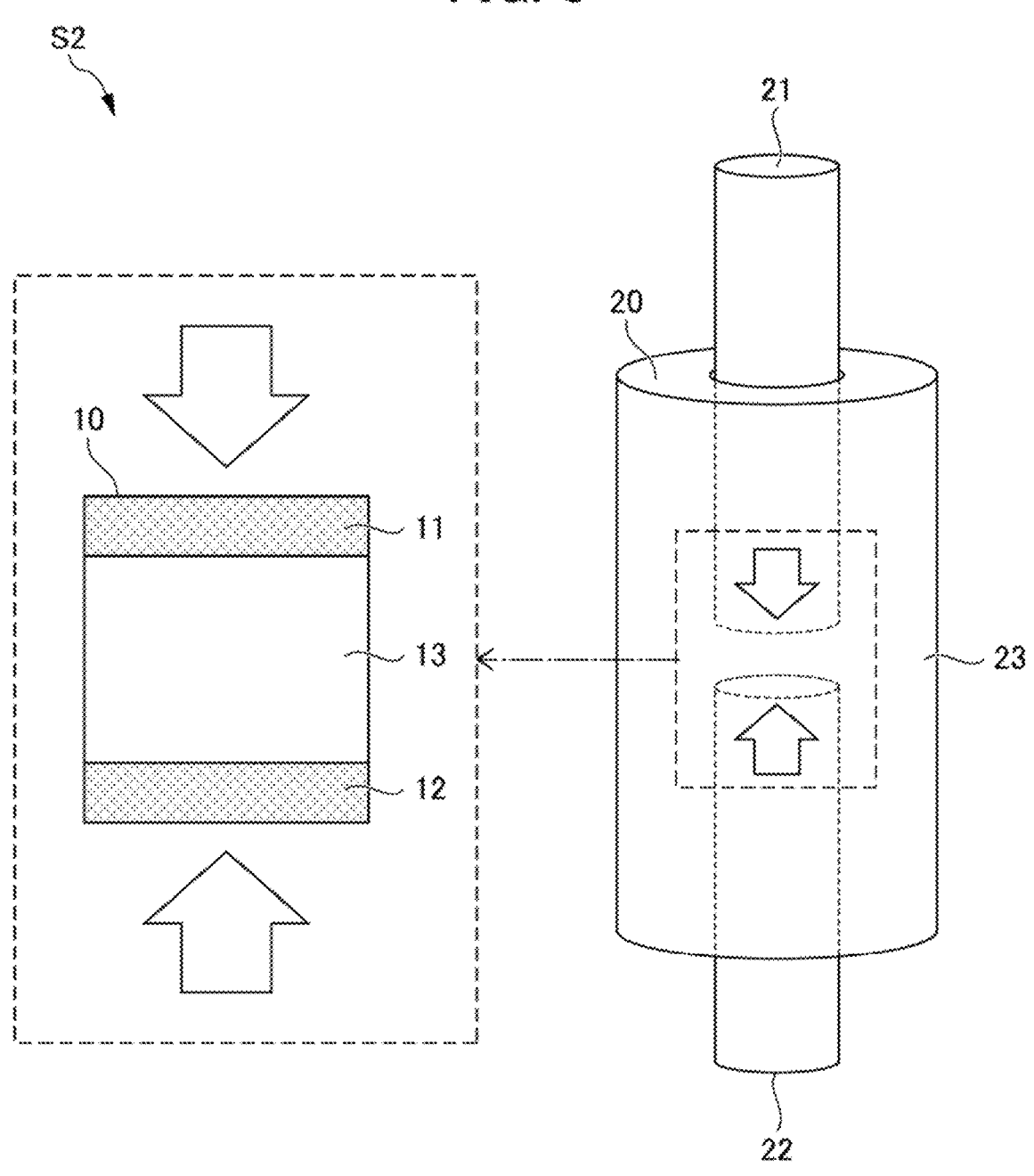
FIG. 3 is a view illustrating a producing step.

FIG. 3 is a view illustrating the producing step S2. The producing step S2, the moving step S3, the dividing step S4, and the detecting step S5 described below are performed in a glove box since the sulfur-based solid electrolyte is anaerobic.

A producing device 20 includes a first press part 21, a second press part 22, and a cylinder part 23. In the producing step S2, the sulfur-based solid electrolyte is first placed inside the cylinder part 23 to sandwich it with the pieces of lithium foil. Next, the first press part 21 is caused to press one of the pieces of lithium foil onto the solid electrolyte, and, from the opposite side, the second press part 22 is caused to press the other one of the pieces of lithium foil onto the solid electrolyte. Note that a hydraulic power device, for example, is used to drive the first press part 21 and the second press part 22. Thereby, the test specimen 10 is formed inside the cylinder part 23. After that, the pressure generated by the first press part 21 and the second press part 22 is released, and the test specimen 10 is removed from the cylinder part 23.

Figure 4:
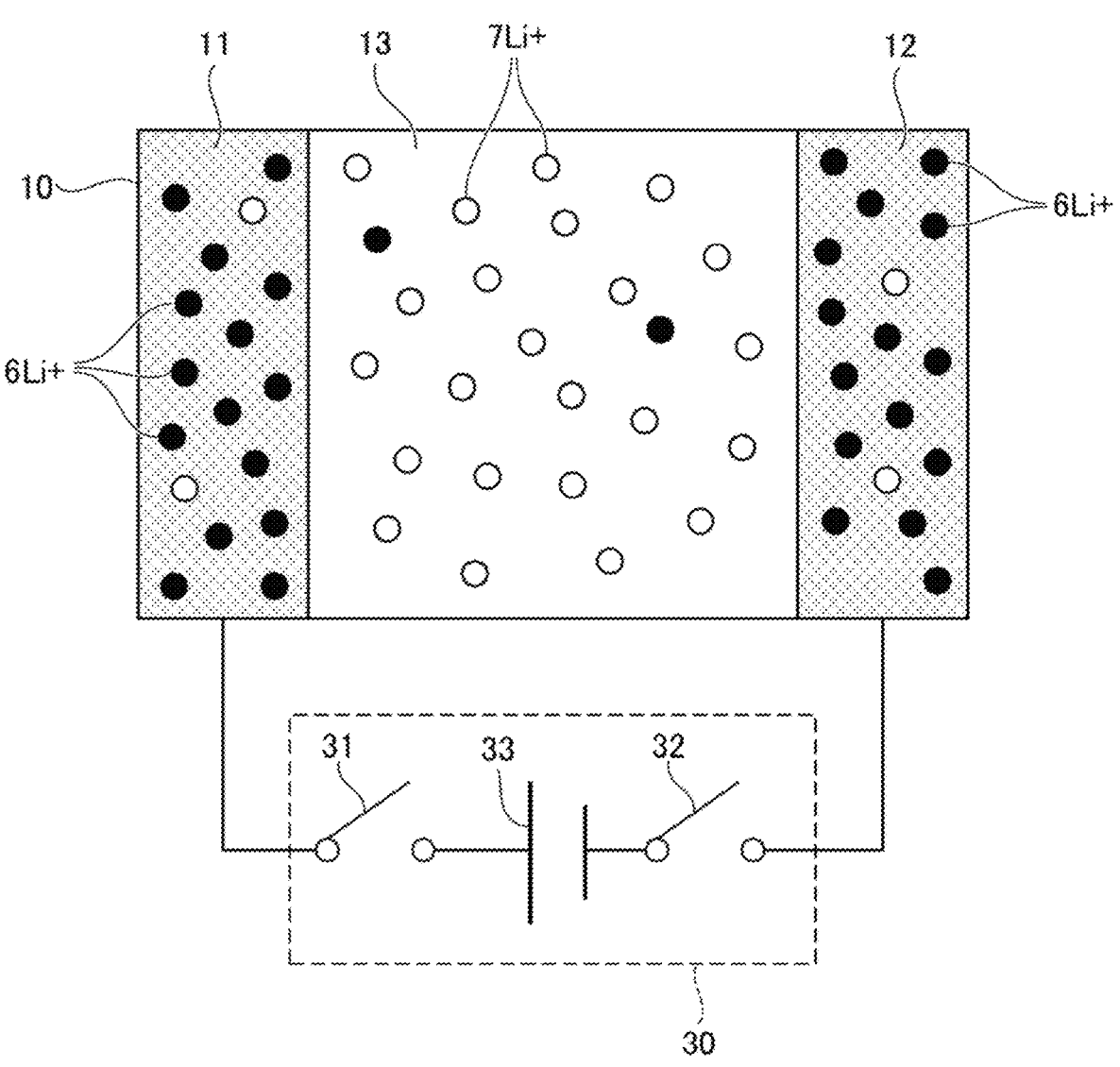
FIG. 4 is a view illustrating a preparing stage in a moving step.

FIG. 4 is a view illustrating a preparing stage in the moving step S3. In this preparing stage, a terminal on a positive electrode side of the mover 30 is coupled to the first electrode 11, and a terminal on a negative electrode side of the mover 30 is coupled to the second electrode 12.

Figure 5:
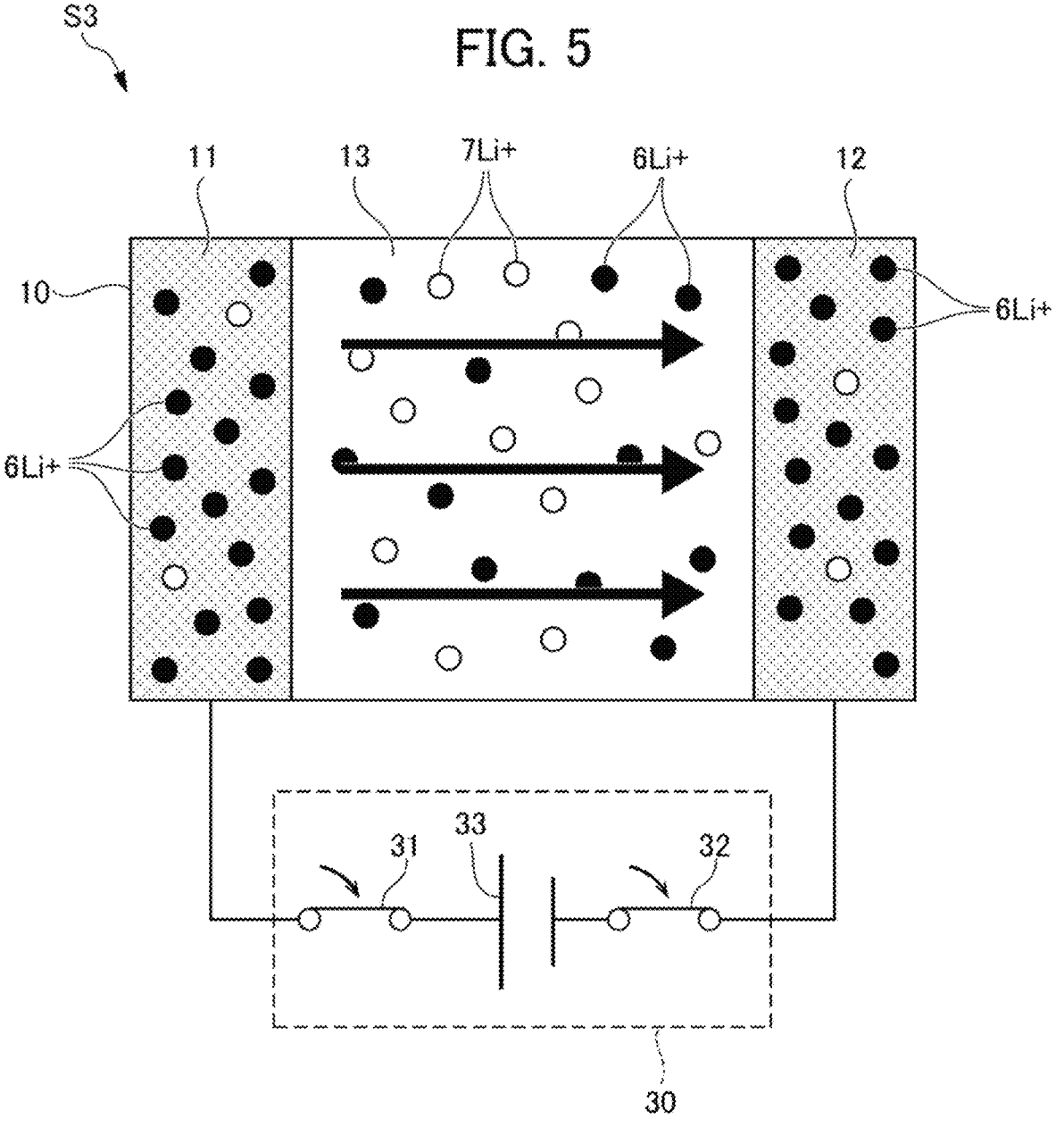
FIG. 5 is a view illustrating the moving step.

FIG. 5 is a view illustrating the moving step S3. In the moving step S3, the switches 31, 32 are turned ON to apply a voltage onto the test specimen 10 once or a plurality of times. Thereby, in the test specimen 10, 6Li+ and 7Li+ are caused to move from the side of the first electrode 11 to the side of the second electrode 12. A direction heading from the side of the first electrode 11 to the side of the second electrode 12, that is, a direction in which 6Li+ and 7Li+ move, will be hereinafter simply referred to as a "moving direction".

Figure 6:
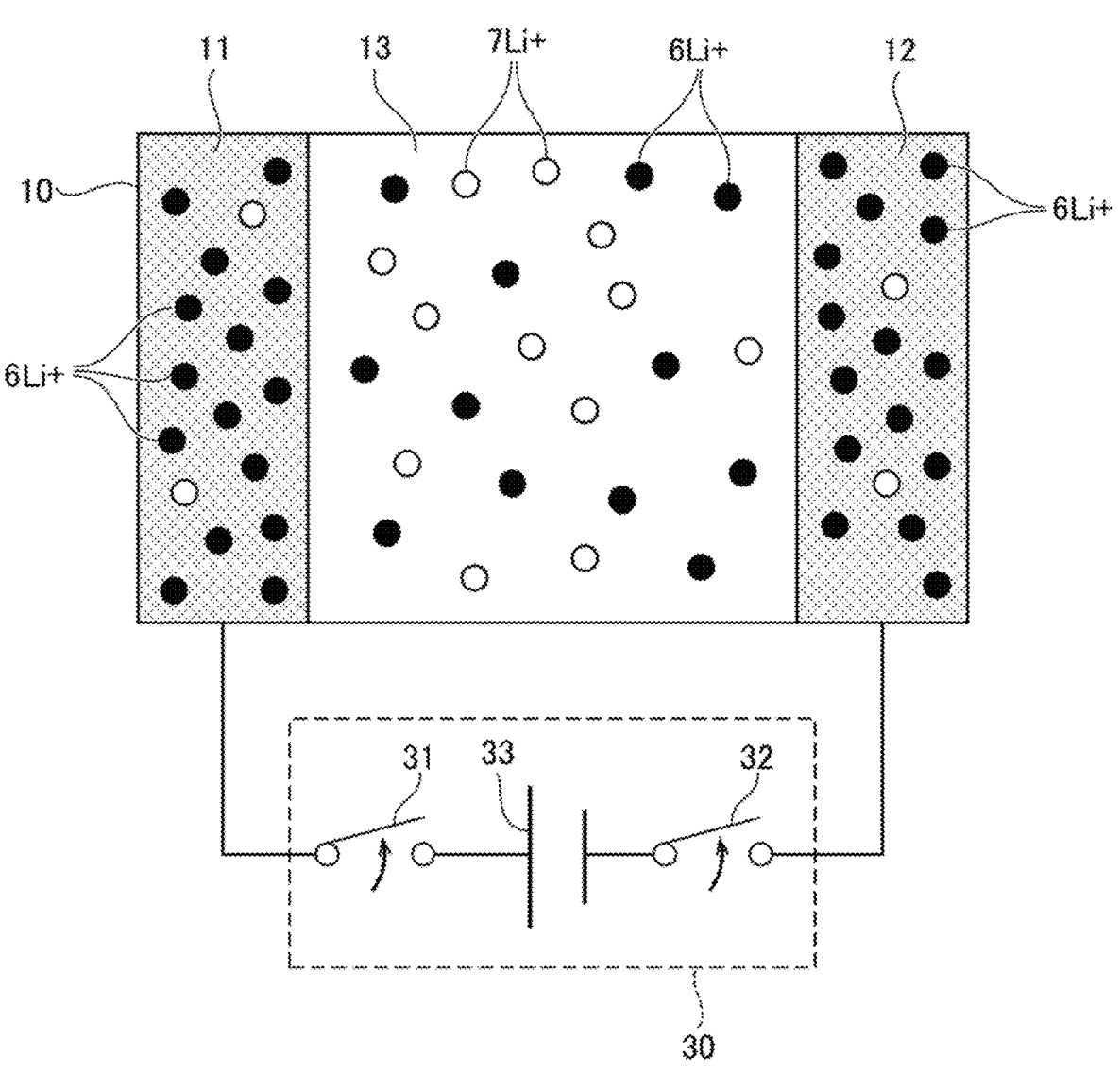
FIG. 6 is a view illustrating a state at a point in time when the moving step has ended.

FIG. 6 is a view illustrating a state at a point in time when the moving step S3 has ended. When the switches 31, 32 are turned OFF, no voltage is applied from the mover 30 onto the test specimen 10, stopping 6Li+ and 7Li+ from moving in the test specimen 10. After that, the mover 30 is removed from the test specimen 10.

Figure 7:
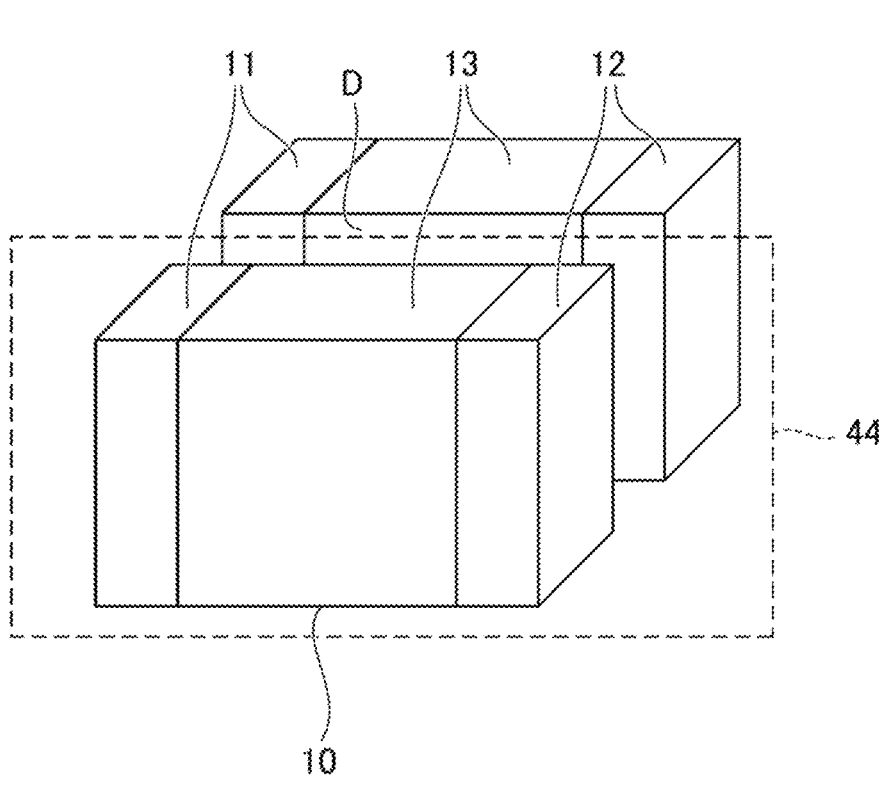
FIG. 7 is a view illustrating a dividing step.

FIG. 7 is a view illustrating the dividing step S4. Using the cutter 44 of the dividing step 40, the test specimen 10 is cut to divide the electrolyte 13. At this time, the electrolyte 13 is divided to allow a divided cross section D of the test specimen 10 to serve as a face extending in the moving direction. After that, cooled ion milling is performed to machine and smooth the divided cross section D.

Figure 8:
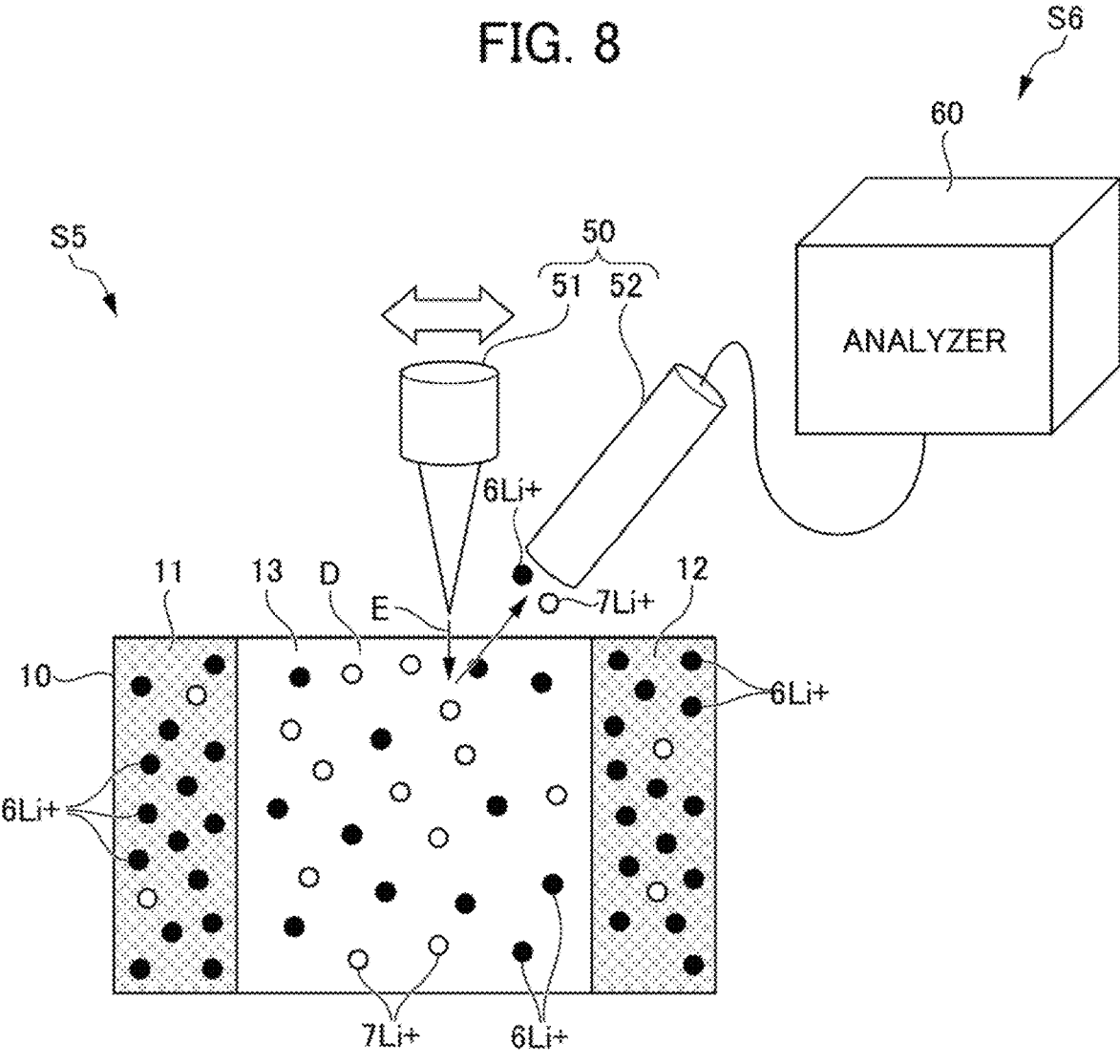
FIG. 8 is a view illustrating a detecting step.

FIG. 8 is a view illustrating the detecting step S5 and the analyzing step S6. In the detecting step S5, sputtering is performed on the divided cross section D to remove damage due to the ion milling described above. After that, the irradiation part 51 is caused to perform the energy irradiation E onto the divided cross section D of the electrolyte 13 to urge discharge of 6Li+ and 7Li+, and the detection part 52 is caused to detect those 6Li+ and 7Li+ that are discharged. At this time, an analytical method making it possible to analyze a difference in mass of isotope, such as laser ablation inductively coupled plasma mass spectrometry (LA-ICP-MS) or time-of-flight secondary ion mass spectrometry (TOF-SIMS) distinguishes 6Li+ and 7Li+ from each other.

In the analyzing step S6, the analyzer 60 analyzes, based on those 6Li+ and 7Li+ that are detected by the detection part 52, a moving state of 6Li+ in the test specimen 10.

Figure 9:
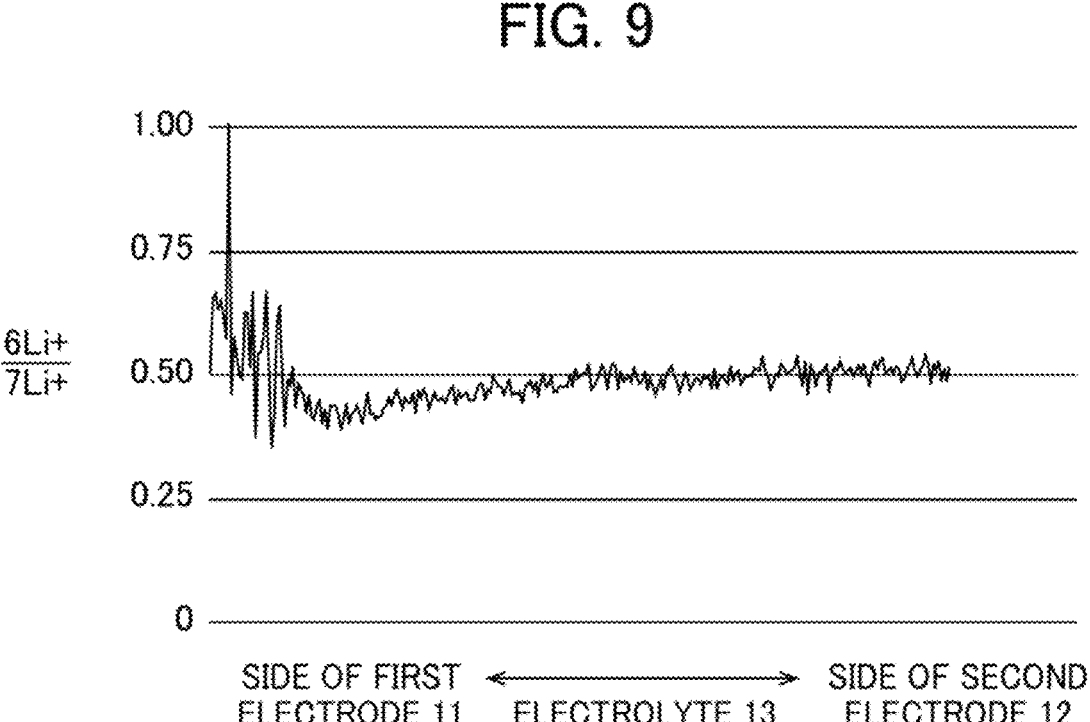
FIG. 9 is a view illustrating how an analysis is performed in an analyzing step.

FIG. 9 is a graph illustrating how an analysis is performed in the analyzing step S6. A horizontal axis in the graph indicates a position in the moving direction in the electrolyte 13. On the other hand, a vertical axis indicates a ratio between those 6Li+ and 7Li+ that are detected at positions in the moving direction. The ratio between those 6Li+ and 7Li+ that are detected will be hereinafter simply referred to as "6Li+/7Li+".

From the graph in FIG. 9, it is possible to know that, in an entire region in the moving direction in the electrolyte 13, 6Li+/7Li+, which is naturally approximately 8%, is equal to or greater than approximately 50%. From this fact, it is possible to know that 6Li+ have reached from the first electrode 11 across the entire region in the moving direction in the electrolyte 13. On the other hand, it is possible to know that, when 6Li+/7Li+ is approximately 8% in the entire region or a partial region in the moving direction in the electrolyte 13, for example, 6Li+ have not yet reached from the first electrode 11 to that region.

Effects of the present embodiment will now be summarized below. According to the present embodiment, it is possible to separately observe, based on a difference in mass, 6Li+ that have moved from the first electrode 11 into the electrolyte 13, from 7Li+. Moreover, by allowing the mover 30 to apply a voltage between the first electrode 11 and the second electrode 12 from outside the test specimen 10, it is possible to apply the voltage between both the terminals of the electrolyte 13 for only an intended period of time. Moreover, since the first electrode 11 and the second electrode 12 both contain metallic lithium and are identical in potential in a state where no voltage is applied from outside the test specimen, there is no concern that a voltage is unintentionally applied between both the terminals of the electrolyte 13. Therefore, it is possible to precisely detect a moving state of 6Li+ at a point in time of targeted voltage application.

Moreover, in the detecting step S5, those 6Li+ and 7Li+ that are discharged from the electrolyte 13 are detected in a state where no voltage is applied from outside the test specimen 10. Therefore, it is possible to simply detect a moving state of 6Li+ at a point in time of targeted voltage application, compared with a case where a voltage is applied onto the test specimen 10 and those 6Li+ and 7Li+ that are discharged from the electrolyte 13 are detected.

Moreover, in the dividing step S4, the electrolyte 13 is divided, and, in the detecting step S5, those 6Li+ and 7Li+ that are discharged from the divided cross section D of the electrolyte 13 are detected. Therefore, it is possible to precisely detect a moving state of 6Li+, compared with a case where the electrolyte 13 is not divided and ions discharged from only an end face of the electrolyte 13 are detected, for example.

Moreover, in the dividing step S4, the electrolyte 13 is divided to allow the divided cross section D to extend in the moving direction. Therefore, it is possible to detect a moving state of 6Li+ at portions in the moving direction in the electrolyte 13.

Moreover, the second electrode 12 contains 6Li+ and 7Li+ each at an abundance ratio identical to that of the first electrode 11. Therefore, it is possible to produce the first electrode 11 and the second electrode 12 using an identical material, that is, using pieces of metallic lithium foil that are identical to each other in type. Therefore, it is possible to easily produce the test specimen 10.

Second Embodiment

Next a second embodiment will now be described herein. For the embodiment described below, its description will be given based on the first embodiment, but by focusing on those points different from the first embodiment. Descriptions of those that are identical or similar to the first embodiment will thus be appropriately omitted.

FIG. 10 is a flowchart illustrating an ion movement measuring method according to the present embodiment. The present embodiment differs from the first embodiment in that the dividing step S4 is not provided, but the moving step S3, the detecting step S5, and the analyzing step S6 are repeated.

In the detecting step S5, in a state where the electrolyte 13 is not divided, the irradiation part 51 performs the energy irradiation E toward the end face of the electrolyte 13, and those 6Li+ and 7Li+ that are discharged from the end face of the electrolyte 13 are detected. Specifically, in the present embodiment, the moving step S3 once ends, and the detecting step S5 is performed in a state where a voltage applied from the mover 30 to the test specimen 10 is canceled. However, instead of this order, the detecting step S5 may be performed at the same time with the moving step S3, that is, while a voltage is applied onto the test specimen 10.

After the detecting step S5, the analyzing step S6 is performed, similarly to the case of the first embodiment. After the analyzing step S6, at S7, it is determined whether the moving step S3, the detecting step S5, and the analyzing step S6 have been performed a predetermined number of times. When it has reached a negative determination, the flow returns to S2, and the moving step S3, the detecting step S5, and the analyzing step S6 are repeated. On the other hand, when it has reached a positive determination at S5, the flow ends.

According to the present embodiment, the moving step S3, the detecting step S5, and the analyzing step S6 are repeated. Thus the detecting step S5 is performed at a plurality of points in time where the total voltage application time in the moving step S3 differ from each other. Therefore, it is possible to detect a moving state of 6Li+ at a plurality of points in time where the total voltage application time differ.

Third Embodiment

Figure 11:
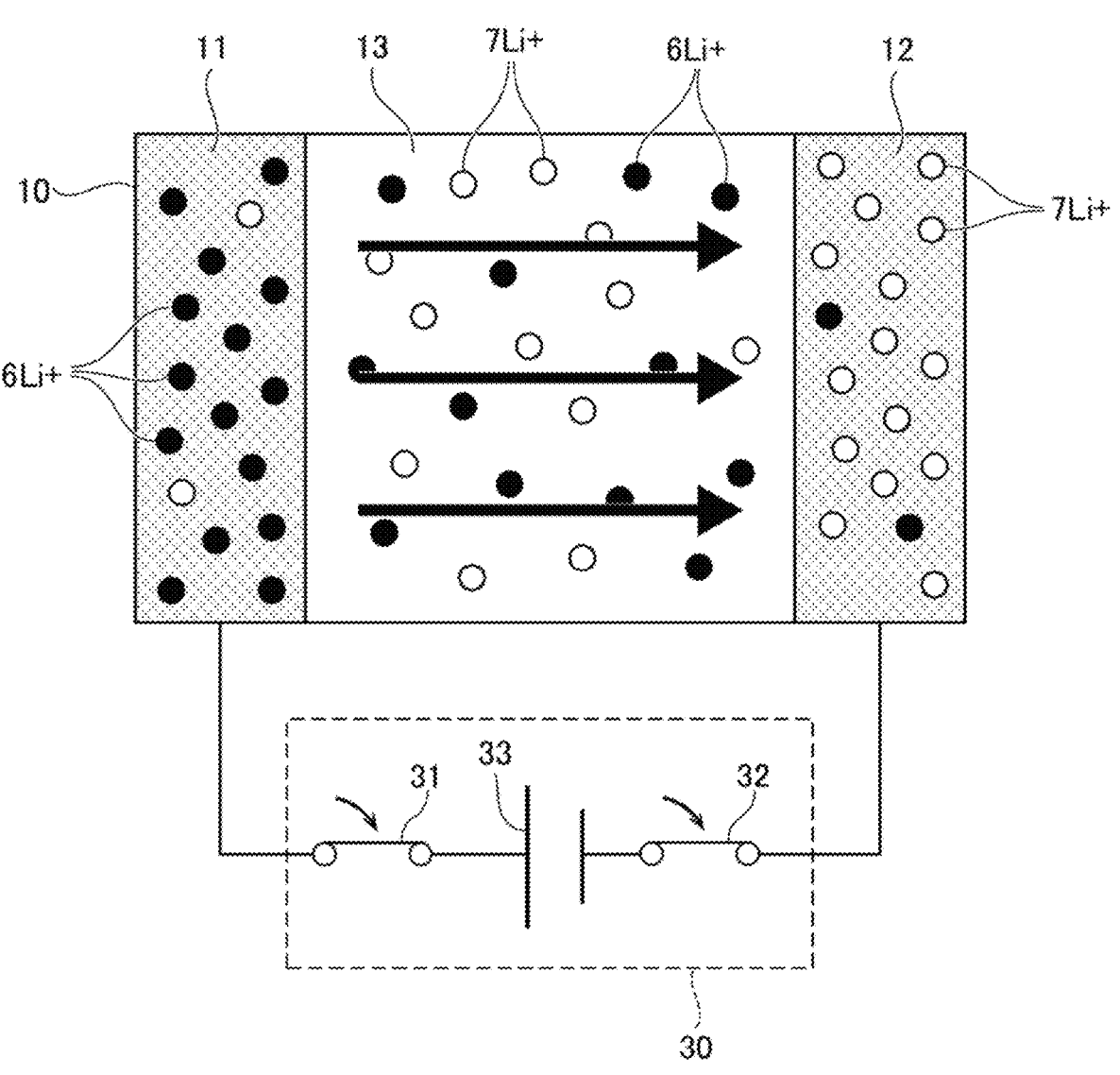
FIG. 11 is a view illustrating a test specimen and other components according to a third embodiment.

FIG. 11 is a view illustrating the test specimen 10 and other components according to a third embodiment. In the present embodiment, the second electrode 12 mainly contains 7Li, instead of 6Li. Therefore, the second electrode 12 contains 7Li at an abundance ratio higher than an abundance ratio of 7Li contained in the first electrode 11, and contains 6Li at an abundance ratio lower than an abundance ratio of 6Li contained in the first electrode 11. Specifically, for example, the second electrode 12 may contain 6Li and 7Li each at its natural abundance ratio, or may contain only and substantially 7Li.

According to the present embodiment, since the first electrode 11 contains 6Li at a higher abundance ratio than that of the second electrode 12, it is possible to easily determine that an increase in 6Li+ in the electrolyte 13 is caused by the fact that 6Li+ have moved from the side of the first electrode 11.

Fourth Embodiment

Figure 12:
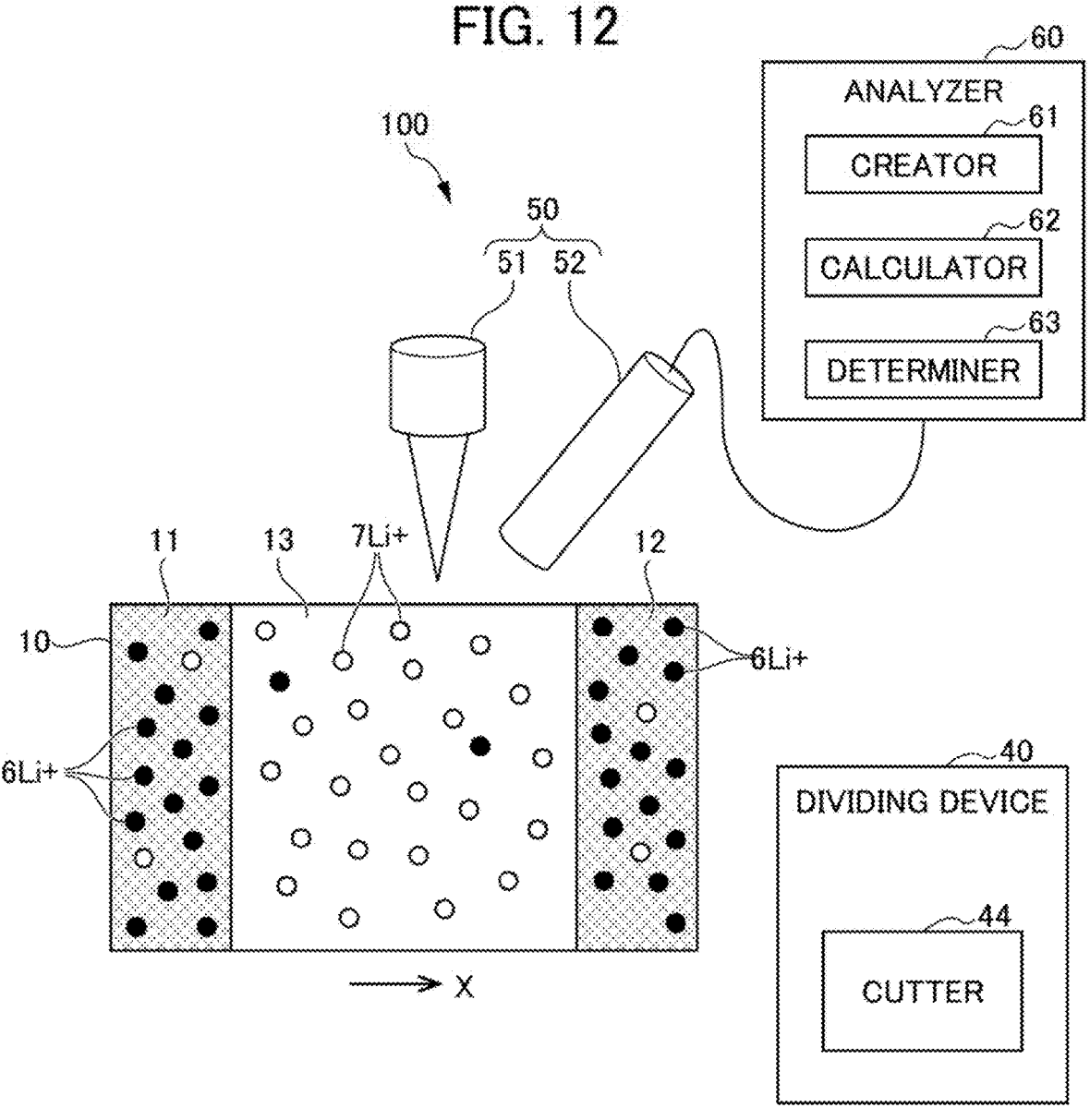
FIG. 12 is a view illustrating an ion movement measuring device according to a fourth embodiment.

FIG. 12 is a schematic view illustrating an ion movement measuring device 100 according to a fourth embodiment. Compared with the first embodiment, the present embodiment differs in that the ion movement measuring device 100 does not include the mover 30 according to the first embodiment, but the analyzer 60 includes a creator 61, a calculator 62, and a determiner 63. In the present embodiment, a single computer includes the creator 61, the calculator 62, and the determiner 63. However, instead of this configuration, for example, the creator 61, the calculator 62, and the determiner 63 may be respectively configured by separate computers.

Figure 13:
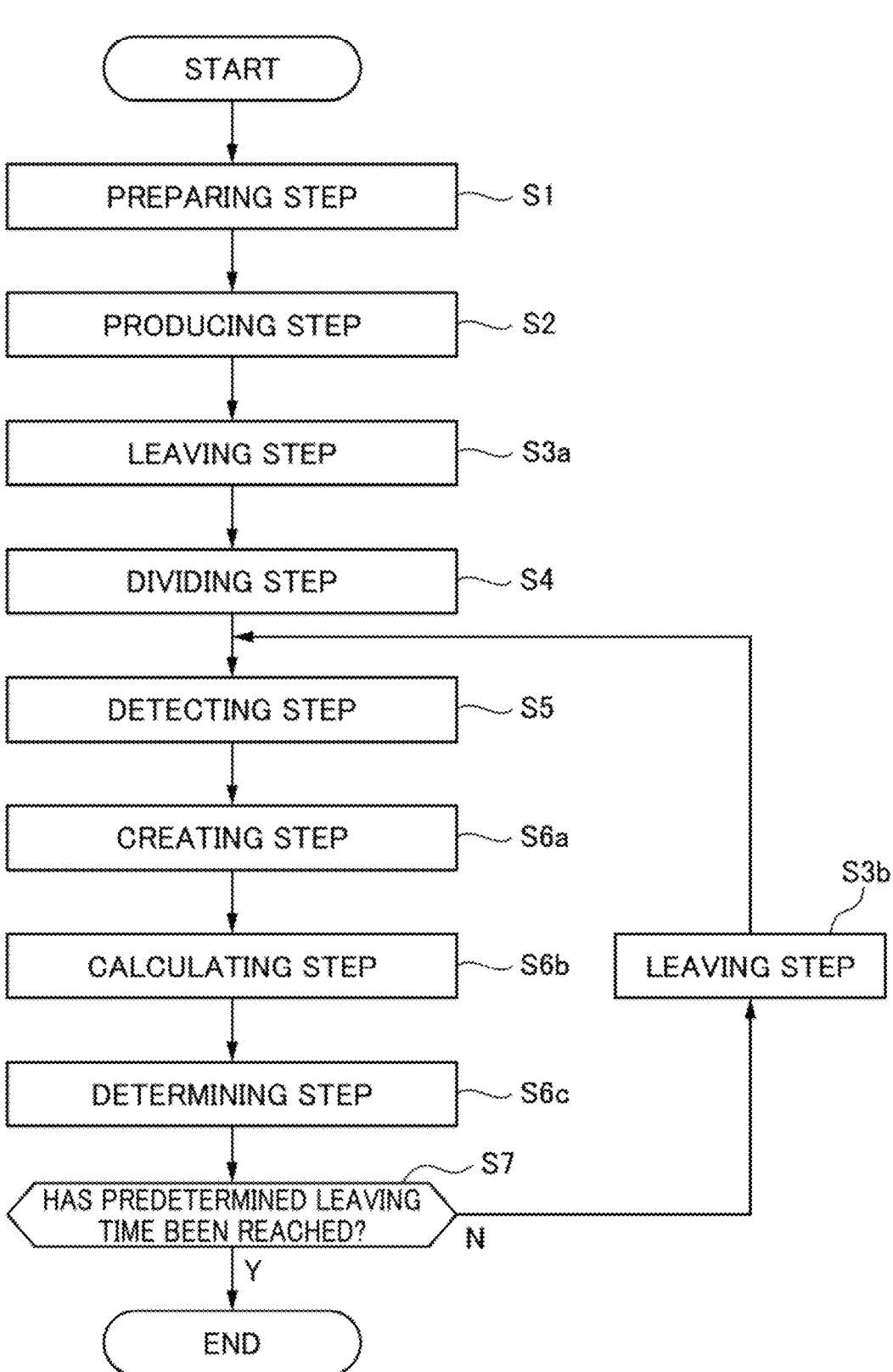
FIG. 13 is a flowchart illustrating an ion movement measuring method.

FIG. 13 is a flowchart illustrating an ion movement measuring method according to the present embodiment. Compared with the first embodiment, the ion movement measuring method according to the present embodiment differs in that:

first of all, instead of the moving step S3, leaving steps S3a, S3b are included;

furthermore, instead of the analyzing step S6, a creating step S6a, a calculating step S6b, and a determining step S6c are included; and furthermore, after the determining step S6c, a leaving time confirmation step S7 is included.

The preparing step S1 and the producing step S2 are similar or identical to those according to the first embodiment. In the leaving step S3a, no voltage is applied between the first electrode 11 and the second electrode 12, but the test specimen 10 is left as it is for a predetermined leaving time t such as two days or four days. The dividing step S4 is similar or identical to that according to the first embodiment.

A direction heading from the side of the first electrode 11 to the side of the second electrode 12, that is, the moving direction according to the first embodiment will be hereinafter referred to as a "diffusion direction X". Compared with the first embodiment, the detecting step S5 according to the present embodiment differs in that the detector 50 detects 6Li+ within a range extending in the diffusion direction X, including not only the electrolyte 13, but also the first electrode 11.

A profile that plots the concentration of 6Li+ at a plurality of points in the diffusion direction X will be hereinafter simply referred to as a "profile", a profile based on actual measurement values will be hereinafter simply referred to an "actual measurement profile Pa", and a profile based on an arithmetic operation will be hereinafter simply referred to an "arithmetic operation profile Pc".

In the creating step S6a, the creator 61 creates an actual measurement profile Pa based on a result of detections in the detecting step S5. A diffusivity coefficient of 6Li+ that diffuse from the electrolyte 13 to the first electrode 11 will be hereinafter referred to as an "electrode diffusivity coefficient DLi" and a diffusivity coefficient of 6Li+ that diffuse from the first electrode 11 to the electrolyte 13 will be hereinafter referred to as an "electrolyte diffusivity coefficient Dse". A combination of the electrode diffusivity coefficient DLi and the electrolyte diffusivity coefficient Dse will be hereinafter referred to as a "diffusion parameter DLi, Dse".

In the calculating step S6b, the calculator 62 uses a plurality of patterns of the diffusion parameters DLi, Dse to calculate an arithmetic operation profile Pc per each of the diffusion parameters DLi, Dse. The details of its calculation method will be described later.

In the determining step S6c, the determiner 63 determines, from among the calculated plurality of the arithmetic operation profiles Pc, the arithmetic operation profile Pc that is identified to have the smallest deviation from the actual measurement profile Pa. The details of its determination method will be described later. Then, the determiner 63 determines the diffusion parameter DLi, Dse that corresponds to the determined arithmetic operation profile Pc.

In the leaving time confirmation step S7, it is determined whether an accumulated period of time of the leaving time t has reached a predetermined period of time. When a negative determination N is reached, the leaving step S3b that is similar or identical to the leaving step S3a is performed, and the flow returns to the detecting step S5. On the other hand, when a positive determination Y is reached in the leaving time confirmation step S7, the flow ends.

Figure 14:
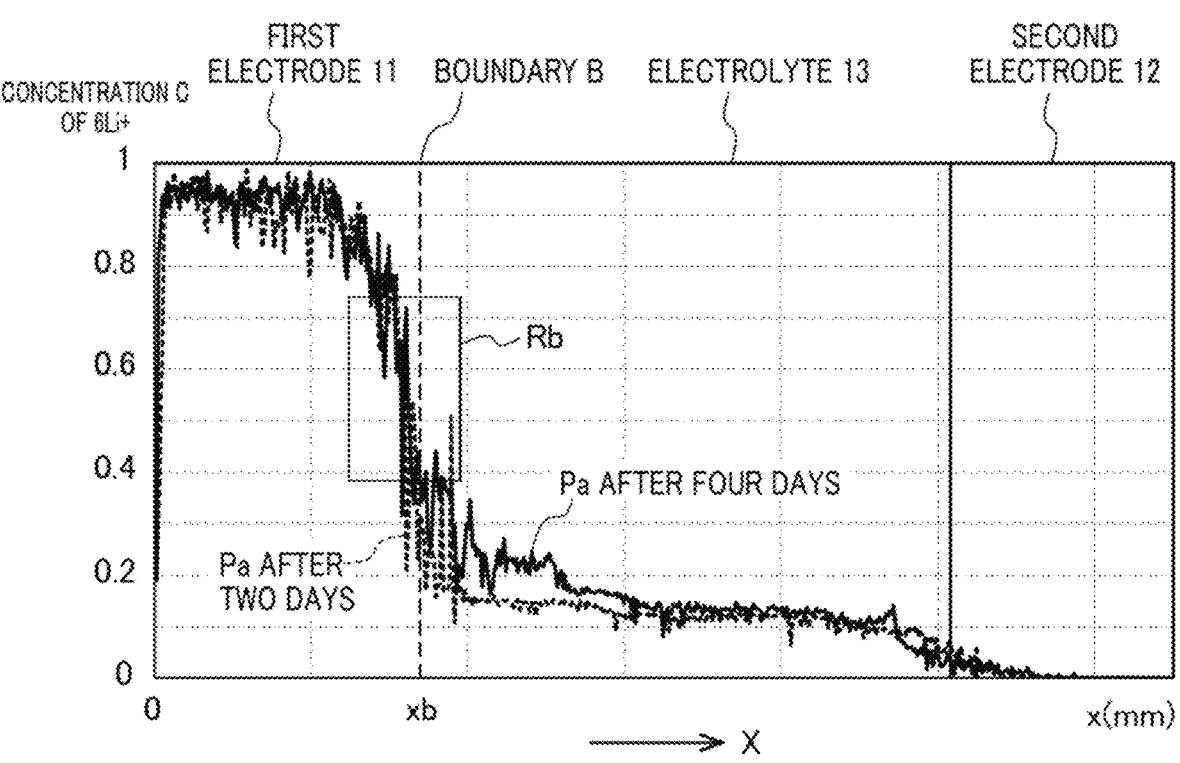
FIG. 14 is a graph illustrating actual measurement profiles.

FIG. 14 is a graph illustrating an example of the actual measurement profiles Pa created in the creating step S6a. The zigzag dotted line illustrates the actual measurement profile Pa when the leaving time t corresponds to two days, and the zigzag solid line illustrates the actual measurement profile Pa when the leaving time t corresponds to four days.

Figure 15:
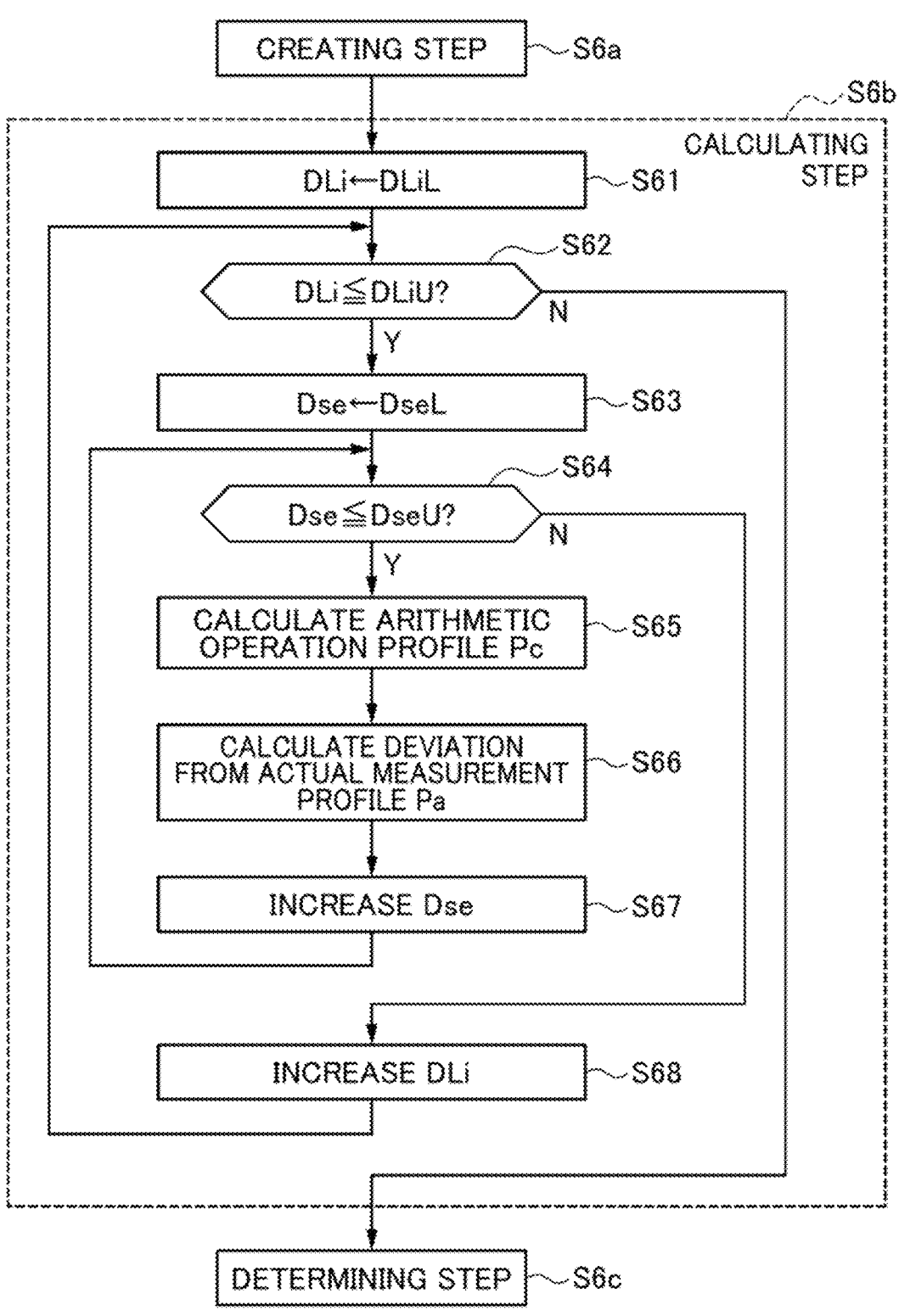
FIG. 15 is a flowchart illustrating details of a calculating step.

FIG. 15 is a flowchart illustrating the details of the calculating step S6b illustrated in FIG. 13. Hereinafter, the lower limit value of the practically achievable range of the electrode diffusion coefficient DLi will be referred to as "lower limit value DLiL", and the upper limit value of this practically achievable range will be referred to as "upper limit value DLiU". Furthermore, the lower limit value of the practically achievable range of electrolyte diffusivity coefficient Dse will be referred to as "lower limit value DseL", and the upper limit value of this practically achievable range will be referred to as "upper limit value DseU".

In S61, the electrode diffusivity coefficient DLi is first set to the lower limit value DLiL. Next, in S62, it is determined whether the electrode diffusivity coefficient DLi is equal to or below the upper limit value DLiU. When a positive determination Y is reached, in S63, the electrolyte diffusivity coefficient Dse is set to the lower limit value DseL.

Next, in S64, it is determined whether the electrolyte diffusivity coefficient Dse is equal to or below the upper limit value DseU. When a positive determination Y is reached, in S65, an arithmetic operation profile Pc is calculated based on the present diffusion parameter DLi, Dse. The details of its calculation will be described later. Next, in S66, a deviation of the calculated arithmetic operation profile Pc from the actual measurement profile Pa is calculated. The details of its calculation will also be described later.

Next, in S67, the electrolyte diffusivity coefficient Dse is increased by a predetermined value, and then the flow returns to S64. After that, as long as a positive determination Y is reached in S64, that is, as long as the electrolyte diffusivity coefficient Dse is equal to or below the upper limit value DseU, the flow repeats S64 to 67.

On the other hand, when a negative determination N is reached in S64, that is, when the electrolyte diffusivity coefficient Dse exceeds the upper limit value, the flow proceeds to S68, the electrode diffusivity coefficient DLi is increased by the predetermined value, and then the flow returns to S62. After that, as long as a positive determination Y is reached in S62, that is, as long as the electrode diffusivity coefficient DLi is equal to or below the upper limit value DLi, the flow repeats S62 to 68.

On the other hand, when a negative determination N is reached in S62, that is, when the electrode diffusivity coefficient DLi exceeds the upper limit value DLiU, the flow proceeds to the determining step S6c.

Next, the calculation of an arithmetic operation profile Pc in S65 illustrated in FIG. 15 will be described with reference to FIGS. 16 and 17.

Figure 16:
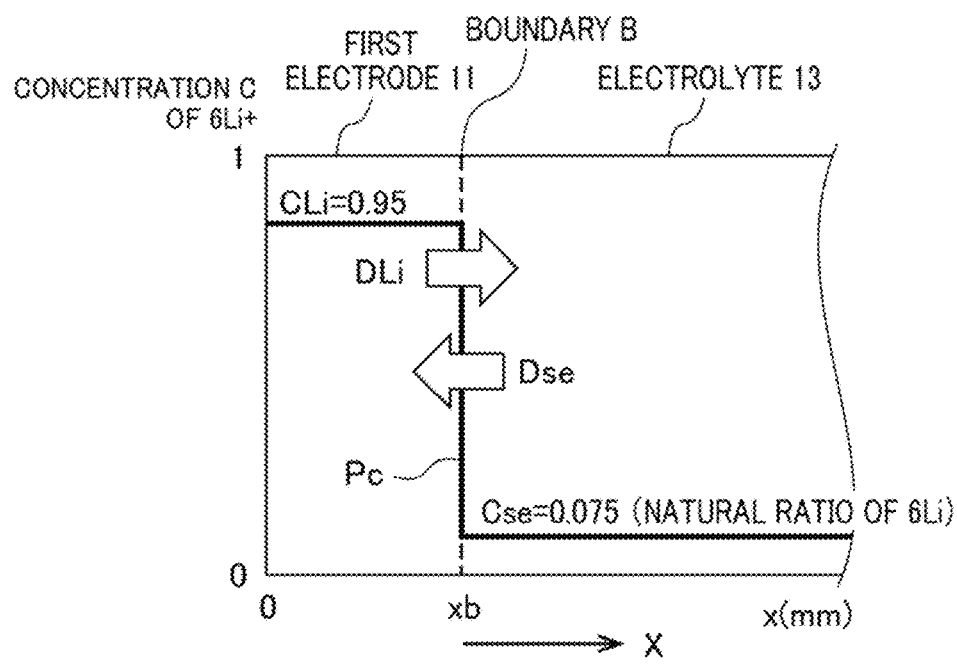
FIG. 16 is a graph illustrating an arithmetic operation profile at a point in time when the leaving time is 0.

FIG. 16 is a graph illustrating an arithmetic operation profile Pc in an initial state where the leaving time is "0". The ratio of 6Li+ with respect to all lithium ions including 6Li+ and 7Li+ will be hereinafter referred to as the "concentration of 6Li+". As described above, it is assumed that, in the initial state, the concentration of 6Li+ in the first electrode 11 is constant at a predetermined initial concentration CLi of 95%, for example, and, furthermore, the concentration of 6Li+ in the electrolyte 13 is constant at a predetermined initial concentration Cse of 7.5% that corresponds to a natural abundance ratio, for example.

From this state, it is assumed that 6Li+ in the first electrode 11 diffuse into the electrolyte 13 in accordance with the electrode diffusivity coefficient DLi, and 6Li+ in the electrolyte 13 diffuse into the first electrode 11 in accordance with the electrolyte diffusivity coefficient Dse.

Figure 17:
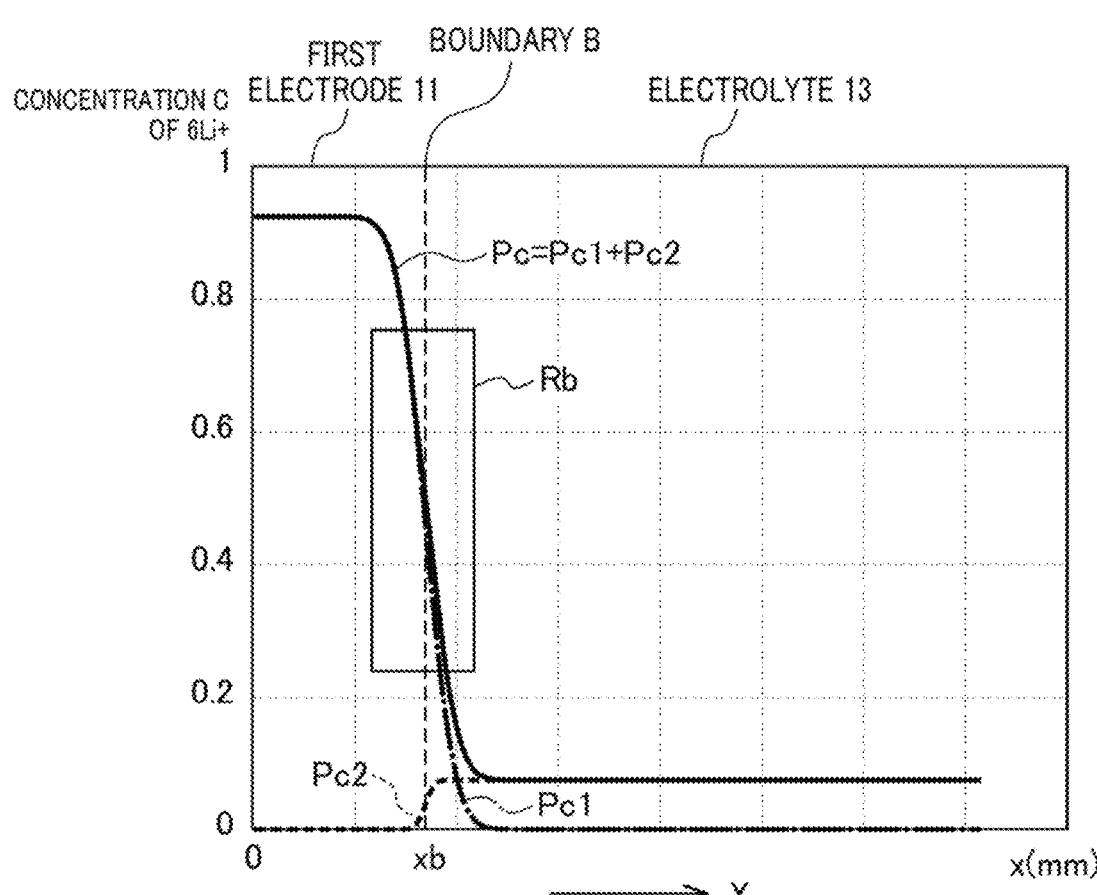
FIG. 17 is a graph illustrating an arithmetic operation profile at a point in time when the leaving time corresponds to a predetermined value.

FIG. 17 is a graph illustrating an arithmetic operation profile Pc in a predetermined state where the leaving time t corresponds to two days, for example. A profile based on the diffusion of 6Li+ from the first electrode 11 to the electrolyte 13 will be hereinafter referred to as a "first profile Pc1", and a profile based on the diffusion of 6Li+ from the electrolyte 13 to the first electrode 11 will be hereinafter referred to as a "second profile Pc2". An arithmetic operation profile Pc is acquired by performing a sum of the first profile Pc1 and the second profile Pc2.

Specifically, it is possible to calculate a first profile Pc1 based on Equation 1 described below, and it is possible to calculate a second profile Pc2 based on Equation 2 described below.

[Equation 1]

$$C(x, t) = \frac{CLi}{2}\left[1 + \mathrm{erf}\left(\frac{-(x - xb)}{2 \times \sqrt{Dse \times t}}\right)\right] \quad \text{(Equation 1)}$$

[Equation 2]

$$C(x, t) = \frac{Cse}{2}\left[1 + \mathrm{erf}\left(\frac{x - xb}{2 \times \sqrt{DLi \times t}}\right)\right] \quad \text{(Equation 2)}$$

In both Equations 1 and 2, the concentration of 6Li+ with the corresponding values of "x" and "t" is represented by "C(x,t)". An error function is represented by "erf". A boundary between the first electrode 11 and the electrolyte 13 will be hereinafter referred to as a "boundary B". A position in the diffusion direction X is represented by "x". A position in the diffusion direction X of the boundary B is represented by "xb". The leaving time t is represented by "t". For this leaving time t, the leaving time t that is identical to that in the case of the actual measurement profile Pa is adopted. That is, the leaving time t at a point in time when 6Li+ are detected in the detecting step is adopted. The initial concentration CLi of 6Li+ in the first electrode 11 is represented by "CLi". The initial concentration Cse of 6Li+ in the electrolyte 13 is represented by "Cse".

Figure 18:
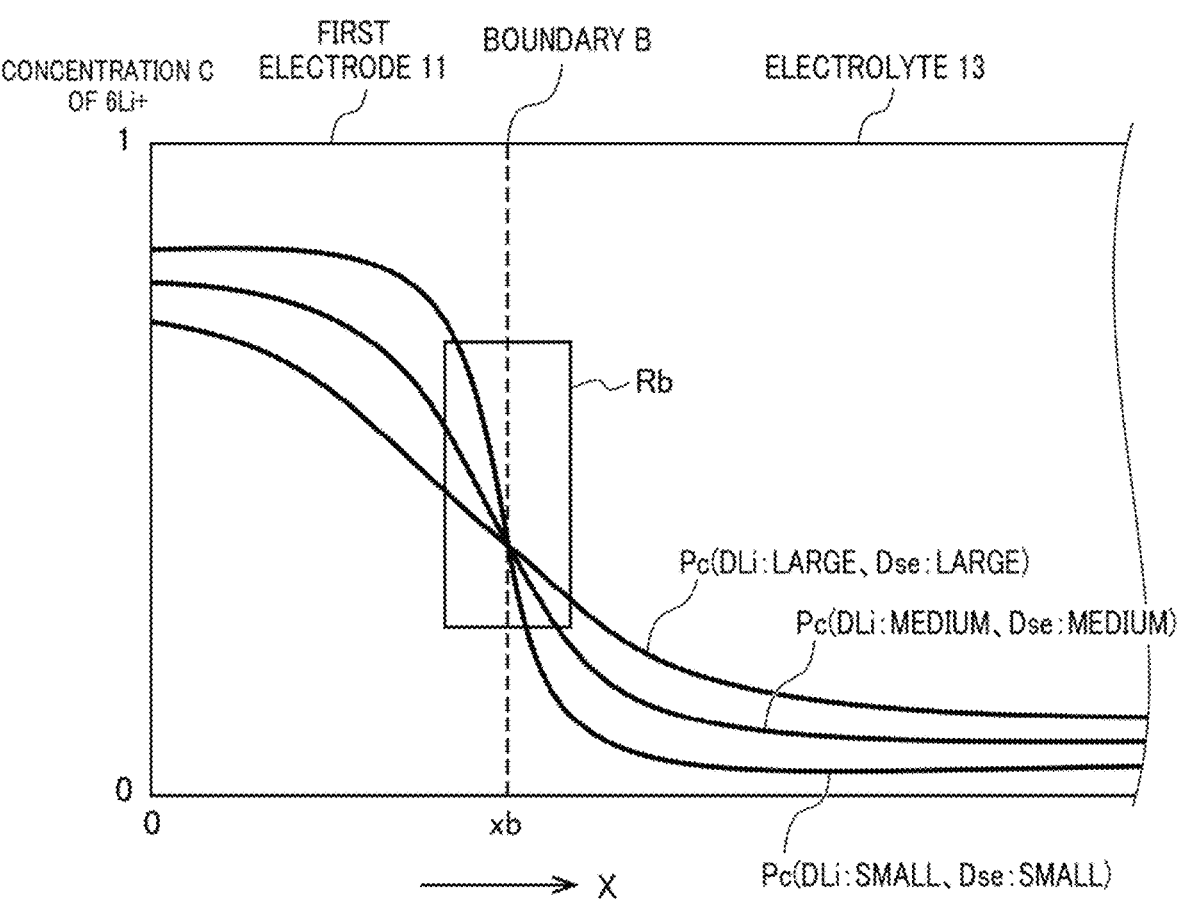
FIG. 18 is a graph illustrating arithmetic operation profiles per diffusion parameter.

Next, the calculation of a deviation in S66 illustrated in FIG. 15 will be described with reference to FIG. 18. The three curves in FIG. 18 respectively illustrate, as examples, arithmetic operation profiles Pc when the electrode diffusivity coefficient DLi and the electrolyte diffusivity coefficient Dse both have relatively greater values, relatively smaller values, and intermediate values. A region including the boundary B and its peripheral region will be hereinafter referred to as a "boundary region Rb".

The calculation of a deviation in S66 is performed by using a least-square method in the boundary region Rb per an arithmetic operation profile Pc. That is, at each of a plurality of points in the diffusion direction X in the boundary region Rb, a difference between the concentration of 6Li+ in an arithmetic operation profile Pc and the concentration of 6Li+ in an actual measurement profile Pa is calculated. A total of squares of the differences at these points is memorized as a deviation parameter indicating a magnitude of deviation.

Then, in the determining step S6c, the arithmetic operation profile Pc that has the smallest deviation parameter described above is determined. Then, the diffusion parameter DLi, Dse corresponding to the determined arithmetic operation profile Pc is determined.

The analyzer 60 illustrated in FIG. 12, for example, displays the determined diffusion parameter DLi, Dse on a display, inputs it into a computer or a memory that configures at least part of the analyzer 60, and outputs it to a computer or a memory outside the analyzer 60.

Next, applications of the determined diffusion parameter DLi, Dse will be described. Based on the determined electrode diffusivity coefficient DLi, the electrolyte diffusivity coefficient Dse, Equations 1 and 2 described above, and a desired leaving time t, it is possible to estimate the diffusion state of 6Li+ in a state where the test specimen 10 is left as it is for the desired leaving time t.

Specifically, based on the determined electrode diffusivity coefficient DLi, Equation 1 described above, and the desired leaving time t, it is possible to acquire a first profile P1 in a state where the test specimen 10 is left as it is for the desired leaving time t. Furthermore, based on the determined electrolyte diffusivity coefficient Dse, Equation 2 described above, and the desired leaving time t, it is possible to acquire a second profile P2 in a state where the test specimen 10 is left as it is for the desired leaving time t. Based on a sum of the first profile P1 and the second profile P2, an arithmetic operation profile Pc in a state where the test specimen 10 is left as it is for the desired leaving time t is acquired. Thereby, it is possible to estimate the diffusion state of 6Li+ in a state where the test specimen 10 is left as it is for the desired leaving time t.

Furthermore, it is possible to correct the determined diffusion parameter DLi, Dse in temperature based on Equations 3, 4 described below.

[Equation 3]

$$DLi = A \exp(-QLi/RT) \tag{Equation 3}$$

[Equation 4]

$$Dse = A \exp(-Qse/RT) \tag{Equation 4}$$

In Equations 3 and 4 described above, a frequency factor is represented by "A". Activation energy QLi of 6Li+ in the first electrode 11 is represented by "QLi", and activation energy Qse of 6Li+ in the electrolyte 13 is represented by "Qse". A gas constant is represented by "R". An absolute temperature of the test specimen 10 is represented by "T".

The details of the correction described above are as described below. Based on the determined electrode diffusivity coefficient DLi, the temperature T corresponding to the actual measurement profile Pa and the arithmetic operation profile Pc used for the determination, and Equation 3 described above, it is possible to acquire the activation energy QLi. In a backward manner from the acquired activation energy QLi, Equation 3 described above, and the desired temperature T, it is possible to acquire an electrode diffusivity coefficient DLi at the desired temperature T. Similarly, it is possible to acquire an electrolyte diffusivity coefficient Dse at the desired temperature T. As described above, it is possible to estimate a diffusion parameter DLi, Dse at the desired temperature T. That is, it is possible to correct the diffusion parameter DLi, Dse in temperature.

The configuration and effects of the present embodiment will now be summarized below.

Also in the present embodiment, as in the case of first embodiment, the first electrode 11 and the second electrode 12 are identical to each other in potential, there is no concern that a voltage is unintentionally applied between both the terminals of the electrolyte 13. Under this circumstance, in the detecting step S5, 6Li+ are detected at a plurality of points in the diffusion direction X in the test specimen 10. Then, in the creating step S6a, an actual measurement profile Pa is created based on a result of detections in the detecting step S5. Therefore, it is possible to precisely detect the movement of 6Li+ due to diffusion without the effects of an unintentional voltage, and to precisely create an actual measurement profile Pa.

Then, in the determining step S6c, an arithmetic operation profile Pc that is identified to have the smallest deviation from the actual measurement profile Pa is determined to determine a diffusion parameter DLi, Dse corresponding to the arithmetic operation profile Pc. Therefore, it is possible to calculate an arithmetic operation profile Pc when a condition such as a leaving time t or a temperature T is changed, in a backward manner from the determined diffusion parameter DLi, Dse. Thereby, it is possible to estimate the diffusion state of 6Li+ when the condition is changed.

Thereby, for example, it is possible to estimate the state of the secondary battery such as the concentration of lithium ions in a certain layer under a desired condition and the amount of electricity that is charged or discharged, and, furthermore, it is possible to optimally set and optimally control the secondary battery.

Other Embodiments

It is possible to modify the embodiments described above as described below, for example. The electrolyte 13 may be a liquid electrolyte, or may be constructed from both a solid electrolyte and a liquid electrolyte.

Furthermore, the first electrode 11 and the second electrode 12 may be formed by stacking a layer of metallic lithium on a base member made of an identical material such as stainless steel. Even in this case, since there will be no difference in potential, which may occur due to a difference in material, between the first electrode 11 and the second electrode 12, the first electrode 11 and the second electrode 12 become identical to each other in potential in a state where no voltage is applied from outside the test specimen 10.

Furthermore, the first electrode 11 and the second electrode 12 may contain another element than metallic lithium, and, in the detecting step S5, ions of first atoms of the element and ions of second atoms which are isotopes of the first atoms may be distinguished from each other.

Furthermore, in the fourth embodiment, a profile of the concentration of 7Li+ may be acquired, instead of a profile of the concentration of 6Li+. Furthermore, in the fourth embodiment, another method than the least-square method may be used to calculate a deviation parameter. Specifically, for example, a total of absolute values of differences at points may be used as a deviation parameter. Furthermore, although, in the fourth embodiment, the calculation of an arithmetic operation profile Pc uses Equations 1, 2 that represent mutual diffusion when two different metals are joined to each other, other equations or models that represent diffusion may be used.

EXPLANATION OF REFERENCE NUMERALS

6Li+ Ion of atom of lithium-6 as ion of second atom
7Li+ Ion of atom of lithium-7 as ion of first atom
10 Test specimen
11 First electrode
12 Second electrode
13 Electrolyte
30 Mover
40 Dividing device
50 Detector
61 Creator
62 Calculator
63 Determiner
S3a Leaving step
S6a Creating step
S6b Calculating step
S6c Determining step
100 Ion movement measuring device
S3 Moving step
S4 Dividing step
S5 Detecting step

What is claimed is:

1. An ion movement measuring device comprising:

a test specimen having a first electrode, a second electrode, and an electrolyte disposed between the first electrode and the second electrode, the first electrode and the second electrode each having a layer of an identical element, and being identical to each other in potential in a state where no voltage is applied from outside the test specimen, at least the first electrode containing first atoms being present at a highest natural abundance ratio in the identical element and second atoms that are isotopes of the first atoms at an abundance ratio higher than a natural abundance ratio of the second atoms in the identical element; and a detector that detects ions of the first atoms and the second atoms, the ions being discharged from the electrolyte.

2. The ion movement measuring device according to claim 1, further comprising a mover that applies a voltage between the first electrode and the second electrode to allow a side of the first electrode to be higher in potential to cause ions of the first atoms and the second atoms to move from the side of the first electrode to a side of the second electrode in the test specimen.

3. The ion movement measuring device according to claim 1, wherein the electrolyte has a solid electrolyte, the identical element is lithium, the first atoms are atoms of lithium-7, and the second atoms are atoms of lithium-6.

4. The ion movement measuring device according to claim 1, wherein the second electrode contains the first atoms and contains the second atoms at an abundance ratio higher than the natural abundance ratio of the second atoms in the identical element.

5. The ion movement measuring device according to claim 1, wherein the second electrode contains the first atoms at an abundance ratio higher than an abundance ratio of the first atoms contained in the first electrode, and contains the second atoms at an abundance ratio lower than an abundance ratio of the second atoms contained in the first electrode.

6. The ion movement measuring device according to claim 1, wherein the detector detects ions of the first atoms and the second atoms at a plurality of points in a direction from the side of the first electrode to the side of the second electrode in the test specimen, and further comprising:

a creator that creates, based on a result of detections by the detector, an actual measurement profile that plots concentration of the ions of the first atoms or the second atoms at the plurality of points;

a calculator that uses a plurality of patterns of diffusion parameters each including a diffusivity coefficient of the ions in the test specimen to calculate, per each of the diffusion parameters, an arithmetic operation profile which is a result of an arithmetic operation for the concentration; and a determiner that determines, from among the calculated plurality of arithmetic operation profiles, the arithmetic operation profile that is identified to have a smallest deviation from the actual measurement profile to determine the diffusion parameter corresponding to the determined arithmetic operation profile.

7. The ion movement measuring device according to claim 6, wherein the diffusion parameters each include the diffusivity coefficient of the ions that diffuse from the electrolyte to one electrode selected from the first electrode and the second electrode and the diffusivity coefficient of the ions that diffuse from the one electrode to the electrolyte.

8. The ion movement measuring device according to claim 1, wherein the electrolyte in the test specimen contains at least one selected from an active material, a conductive auxiliary agent, and a binder.

9. An ion movement measuring method using a test specimen having a first electrode, a second electrode, and an electrolyte disposed between the first electrode and the second electrode, the first electrode and the second electrode each having a layer of an identical element, and being identical to each other in potential in a state where no voltage is applied from outside the test specimen, at least the first electrode containing first atoms present at a highest natural abundance ratio in the identical element and second atoms that are isotopes of the first atoms at an abundance ratio higher than a natural abundance ratio of the second atoms in the identical element, the ion movement measuring method comprising a detecting step of detecting ions of the first atoms and the second atoms, the ions being discharged from the electrolyte.

10. The ion movement measuring method according to claim 9, further comprising a moving step of causing ions of the first atoms and the second atoms to move from a side of the first electrode to a side of the second electrode in the test specimen by applying a voltage from outside the test specimen, between the first electrode and the second electrode to allow the side of the first electrode to be higher in potential, wherein, in the detecting step, ions of the first atoms and the second atoms, the ions being discharged from the electrolyte, during or after the moving step, are detected.

11. The ion movement measuring method according to claim 10, wherein the detecting step is performed in a state where an external voltage is not applied to the test specimen after the moving step.

12. The ion movement measuring method according to claim 11, further comprising a dividing step of dividing the electrolyte between the moving step and the detecting step, wherein, in the detecting step, ions of the first atoms and the second atoms are discharged from a divided cross section of the electrolyte and are detected.

13. The ion movement measuring method according to claim 12, wherein, in the dividing step, the electrolyte is divided such that the divided cross section extends from the first electrode to the second electrode.

14. The ion movement measuring method according to claim 11, wherein, in the detecting step, ions discharged from an end face of the electrolyte are detected in a state where the electrolyte is not divided, and the detecting step is performed at a plurality of time points, each time point corresponding to a different total voltage application time during the moving step.

15. The ion movement measuring method according to claim 9, wherein the electrolyte has a solid electrolyte, the identical element is lithium, the first atoms are atoms of lithium-7, and the second atoms are atoms of lithium-6.

16. The ion movement measuring method according to claim 9, wherein, in the detecting step, ions of the first atoms and the second atoms are detected at a plurality of points in a direction from the side of the first electrode to the side of the second electrode in the test specimen, and further comprising:

creating, based on a result of detections in the detecting step, an actual measurement profile that plots concentration of the ions of the first atoms or the second atoms at the plurality of points;

calculating, per each of diffusion parameters, an arithmetic operation profile which is a result of an arithmetic operation for the concentration by using a plurality of patterns of the diffusion parameters each including a diffusivity coefficient of the ions in the test specimen; and determining, from among the calculated plurality of arithmetic operation profiles, the arithmetic operation profile that is identified to have a smallest deviation from the actual measurement profile to determine the diffusion parameter corresponding to the determined arithmetic operation profile.

17. The ion movement measuring method according to claim 16, wherein the diffusion parameters each include the diffusivity coefficient of the ions that diffuse from the electrolyte to one electrode of the first electrode and the second electrode and the diffusivity coefficient of the ions that diffuse from the one electrode to the electrolyte.

18. The ion movement measuring method according to claim 9, wherein the electrolyte in the test specimen contains at least one of an active material, a conductive auxiliary agent, or a binder.

\* \* \* \* \*